United States Patent
Matsui et al.

(10) Patent No.: US 12,135,472 B2
(45) Date of Patent: Nov. 5, 2024

(54) OPTICAL MATERIAL, POLYMERIZABLE COMPOSITION FOR OPTICAL MATERIAL, CURED PRODUCT, OPTICAL MATERIAL, PLASTIC LENS, METHOD OF PRODUCING OPTICAL MATERIAL, AND METHOD OF USING OPTICAL MATERIAL

(71) Applicants: MITSUI CHEMICALS, INC., Tokyo (JP); ITOH OPTICAL INDUSTRIAL CO., LTD., Gamagori (JP)

(72) Inventors: Yusuke Matsui, Omuta (JP); Kouji Suesugi, Arao (JP); Shinsuke Ito, Omuta (JP); Hirofumi Oda, Gamagori (JP)

(73) Assignees: MITSUI CHEMICALS, INC., Tokyo (JP); ITOH OPTICAL INDUSTRIAL CO., LTD., Gamagori (JP)

( * ) Notice: Subject to any disclaimer, the term of this patent is extended or adjusted under 35 U.S.C. 154(b) by 534 days.

(21) Appl. No.: 17/604,639

(22) PCT Filed: Apr. 17, 2020

(86) PCT No.: PCT/JP2020/016889
§ 371 (c)(1),
(2) Date: Oct. 18, 2021

(87) PCT Pub. No.: WO2020/213716
PCT Pub. Date: Oct. 22, 2020

(65) Prior Publication Data
US 2022/0197063 A1    Jun. 23, 2022

(30) Foreign Application Priority Data
Apr. 19, 2019   (JP) .................................. 2019-079855

(51) Int. Cl.
G02C 7/10 (2006.01)
C08G 18/38 (2006.01)
(Continued)

(52) U.S. Cl.
CPC ......... G02C 7/104 (2013.01); C08G 18/3876 (2013.01); C08G 18/758 (2013.01);
(Continued)

(58) Field of Classification Search
CPC ..... C08K 5/0041; C08K 5/0091; C08L 75/04; C08L 81/00; C08L 2666/70; G02B 1/041;
(Continued)

(56) References Cited

U.S. PATENT DOCUMENTS

2003/0078359 A1    4/2003   Ichinohe
2010/0331515 A1    12/2010  Takeuchi et al.
(Continued)

FOREIGN PATENT DOCUMENTS

CN    102830506 A    12/2012
EP    2 921 511 A1   9/2015
(Continued)

OTHER PUBLICATIONS

E313-20 Section 6 Yellowness Index (Year: 2024).*
(Continued)

*Primary Examiner* — Travis S Fissel
(74) *Attorney, Agent, or Firm* — BUCHANAN, INGERSOLL & IROONEY PC

(57) ABSTRACT

In an optical material, a transmittance curve satisfies the following characteristics (1) and (2) and a hue in the CIE 1976 (L*, a*, b*) color space satisfies the following characteristic (3),
(1) the transmittance curve has a maximum value of a transmittance at a wavelength of from 400 nm to 450 nm or from 520 nm to 570 nm, and a largest value of
(Continued)

the transmittance at the wavelength of from 400 nm to 450 nm and a transmittance at from 520 nm to 570 nm are 50% or more, (2) the transmittance curve has a minimum value of a transmittance at a wavelength of from 470 nm to 500 nm, and the minimum value is 40% or less, and (3) in the hue in the CIE 1976 (L*, a*, b*) color space, a* is from 2.5 to 5.5 and b* is from 5 to 25.

7 Claims, 2 Drawing Sheets

(51) Int. Cl.
 *C08G 18/75* (2006.01)
 *C08K 5/00* (2006.01)
 *G02B 5/22* (2006.01)

(52) U.S. Cl.
 CPC .......... *C08K 5/0041* (2013.01); *C08K 5/0091* (2013.01); *G02B 5/22* (2013.01)

(58) Field of Classification Search
 CPC .......... G02B 5/22; G02B 5/223; G02C 7/104; G02C 7/108; G02C 7/022; G02C 7/105; C08G 18/3876; C08G 18/758; C09B 5/002; C09B 26/06; C09B 27/00; C09B 47/04; C09B 47/06; C09B 47/065; C09B 47/067; C09B 47/0671; C09B 47/0673; C09B 47/0675; C09B 47/0676; C09B 47/0678; C09B 47/08; C09B 47/26; C09B 47/25; C09B 47/12; C09B 47/10; C09B 62/095; C09B 62/10
 USPC .............................. 351/159.24, 159.32, 159.6
 See application file for complete search history.

(56) References Cited

U.S. PATENT DOCUMENTS

| | | |
|---|---|---|
| 2011/0228214 A1 | 9/2011 | von Blanckenhagen |
| 2012/0225996 A1 | 9/2012 | Kawato et al. |
| 2013/0194658 A1 | 8/2013 | Tamura et al. |
| 2015/0192800 A1 | 7/2015 | Dirk et al. |
| 2016/0216407 A1 | 7/2016 | Kojima et al. |
| 2016/0282532 A1 | 9/2016 | Le et al. |
| 2018/0016415 A1 | 1/2018 | Kakinuma et al. |
| 2018/0284486 A1 | 10/2018 | Gallas et al. |
| 2022/0214475 A1 | 7/2022 | Matsui et al. |

FOREIGN PATENT DOCUMENTS

| | | | |
|---|---|---|---|
| EP | 3045941 A1 * | 7/2016 | ........... C08K 5/0041 |
| EP | 3 333 207 A1 | 6/2018 | |
| JP | H07306387 A | 11/1995 | |
| JP | 2003084242 A | 3/2003 | |
| JP | 2010535538 A | 11/2010 | |
| JP | 2011237730 A | 11/2011 | |
| JP | 2012058643 A | 3/2012 | |
| JP | 2012123236 A | 6/2012 | |
| JP | 2013238634 A | 11/2013 | |
| JP | 2017533449 A | 11/2017 | |
| JP | 6324973 B2 | 5/2018 | |
| WO | 2009015457 A1 | 2/2009 | |
| WO | 2009101867 A1 | 8/2009 | |
| WO | 2011055540 A1 | 5/2011 | |
| WO | WO-2014011581 A2 * | 1/2014 | ........... A61M 21/00 |
| WO | 2015037627 A1 | 3/2015 | |
| WO | 2016/014713 A1 | 1/2016 | |
| WO | 2016125736 A1 | 8/2016 | |
| WO | 2019/032348 A1 | 2/2019 | |

OTHER PUBLICATIONS

Anonymous: "Spectrophotometer CM-5 Instruction Manual", Jan. 1, 2009, XP093008713, Retrieved from the Internet: [on Dec. 15, 2022], "URL:https:/www.konicaminolta.com/instruments/download/instruction_manual/color/pdf/cm-5_instruction_eng.pdf", pp. 67-71. (174 pages). (Cited in Extended European Search Report issued Apr. 18, 2023, in European Patent Application No. 20791488.8).

"There are many changes in the new ANSI Z87.1 Standard", 2020, 4 pages.

* cited by examiner

OPTICAL MATERIAL, POLYMERIZABLE COMPOSITION FOR OPTICAL MATERIAL, CURED PRODUCT, OPTICAL MATERIAL, PLASTIC LENS, METHOD OF PRODUCING OPTICAL MATERIAL, AND METHOD OF USING OPTICAL MATERIAL

TECHNICAL FIELD

The present disclosure relates to an optical material, a polymerizable composition for optical materials, a cured product, an optical material, a plastic lens, a method of producing optical materials, and a method of using an optical material.

BACKGROUND ART

Since a plastic lens is lighter than an inorganic lens, is not easily broken, and can be dyeable, the plastic lens has become rapidly widespread as an optical material such as a spectacle lens or a camera lens.

In recent years, a lens capable of improving visibility of an object or an image by suppressing transmission of light of a specific wavelength or a spectacle lens capable of reducing an influence on eyes have been developed.

Patent Document 1 discloses an anti-glare lens containing a porphyrin compound. Patent Document 2 discloses a spectacle lens containing a porphyrin compound and describes that the lens is excellent in contrast.

Patent Document 3 discloses a lens containing a porphyrin compound having a specific transmittance curve. The document discloses that the lens is excellent in visibility of an object at night.

Patent Document 1: Japanese Patent Application Laid-Open No. 2013-238634
Patent Document 2: Japanese Patent Application Laid-Open No. 2011-237730
Patent Document 3: WO2015/037627

SUMMARY OF INVENTION

Technical Problem

In recent years, an intrinsically photosensitive retinal ganglion cell (ipRGC) which is a new photoreceptor has been discovered on the retina of mammals, and it has been found that ipRGC is involved in optical entrainment of circadian rhythm, pupillary reflex, and the like.

In addition, as one of the symptoms of migraine, there are many cases of having a symptom of photosensitivity that a person feels sensitive to light at the time of a headache, but it is suggested that ipRGC may be involved in photosensitivity of migraine.

Since ipRGC strongly reacts to blue component light in a wavelength range of from 450 to 500 nm, an effect of preventing and reducing migraine of a user is expected by using eyewear such as glasses or sunglasses including a lens having a low transmittance of blue component light in a wavelength range of from 450 to 500 nm.

Furthermore, since a lens having a low transmittance of blue component light in a wavelength range of from 450 to 500 nm is yellowish in appearance, there is also a need for a lens having a natural hue for a user.

Solution to Problem

As a result of conducting intensive studies, the present inventors found that migraine caused by photosensitivity can be reduced by setting a transmittance of blue component light in a wavelength range of from 450 to 500 nm to a predetermined range, thereby completing the disclosure.

That is, the invention of the disclosure can be shown below.

<1> An optical material in which a transmittance curve satisfies the following characteristics (1) and (2) and a hue in a CIE 1976 (L*, a*, b*) color space satisfies the following characteristic (3), the transmittance curve and the hue being measured at a thickness of 2 mm:
  (1) the transmittance curve has a maximum value of transmittance at a wavelength of from 400 nm to 450 nm or from 520 nm to 570 nm, and a largest value of transmittance at the wavelength of from 400 nm to 450 nm, and transmittance at from 520 nm to 570 nm, are 50% or more,
  (2) the transmittance curve has a minimum value of transmittance at a wavelength of from 470 nm to 500 nm, and the minimum value is 40% or less, and
  (3) in the hue in the CIE 1976 (L*, a*, b*) color space, a* is from 2.5 to 5.5 and b* is from 5 to 25.

<2> The optical material according to <1>, wherein a yellow index (YI) is from 25 to 45.

<3> The optical material according to <1> or <2>, wherein an organic dye containing at least one selected from porphyrin-based compounds represented by the following Formula (1) is contained in an amount of from 5 ppm to 50 ppm,

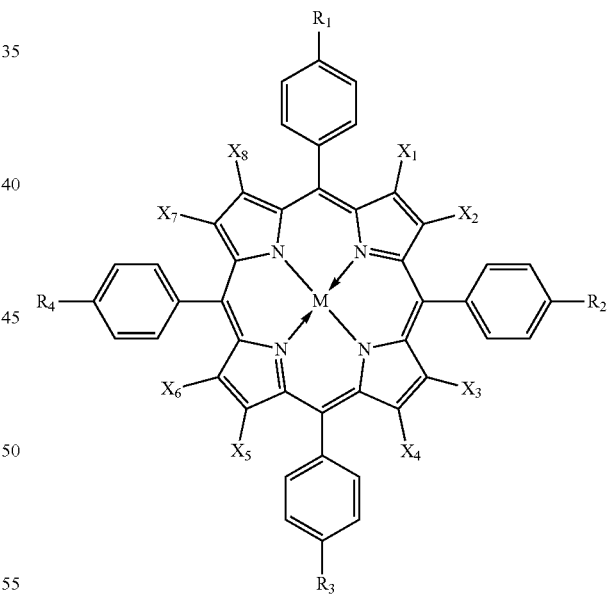

(1)

wherein, in Formula (1), each of $X_1$ to $X_8$ independently represents a hydrogen atom, a linear or branched alkyl group, an ethynyl group, an ethynyl group substituted with a linear or branched alkyl group, an ethynyl group having a phenyl group, or an ethynyl group having a phenyl group substituted with a linear or branched alkyl group, not all of $X_1$ to $X_8$ are hydrogen atoms, each of $R_1$ to $R_4$ independently represents a hydrogen atom or a linear or branched alkyl group, and M represents two hydrogen atoms, a divalent metal atom, a trivalent substituted metal atom, a tetravalent substituted metal atom, a hydroxylated metal atom, or an oxidized metal atom.

<4> The optical material according to <3>, wherein the organic dye contains at least one selected from porphyrin-based compounds represented by the following Formula (1-1) and the following Formula (1-2).

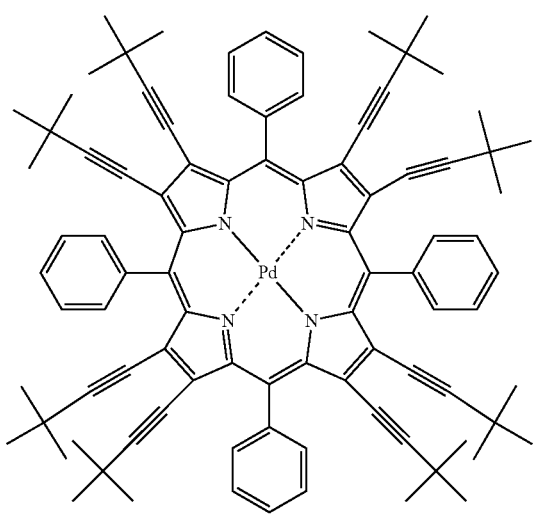

(1-1)

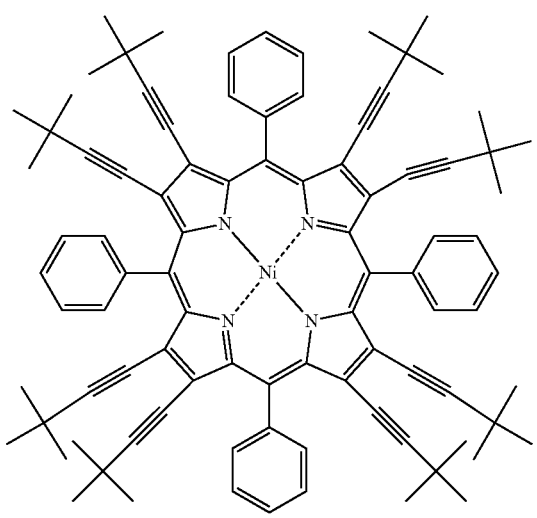

(1-2)

<5> The optical material according to <3> or <4>, wherein a color tone adjusting agent is further contained in an amount of from 3 ppm to 20 ppm.

<6> The optical material according to any one of <1> to <5>, wherein at least one selected from poly(thio)urethane or poly(thio)urethane urea is contained.

<7> The optical material according to any one of <1> to <6>, wherein the optical material is used as a lens for reducing migraines.

<8> A polymerizable composition for an optical material, the polymerizable composition comprising:

an isocyanate compound (A);

at least one active hydrogen compound (B) selected from the group consisting of a polythiol compound having two or more mercapto groups, a hydroxythiol compound having one or more mercapto groups and one or more hydroxyl groups, a polyol compound having two or more hydroxyl groups, and an amine compound; and from 5 ppm to 50 ppm of an organic dye (C) containing at least one selected from porphyrin-based compounds represented by the following Formula (1),

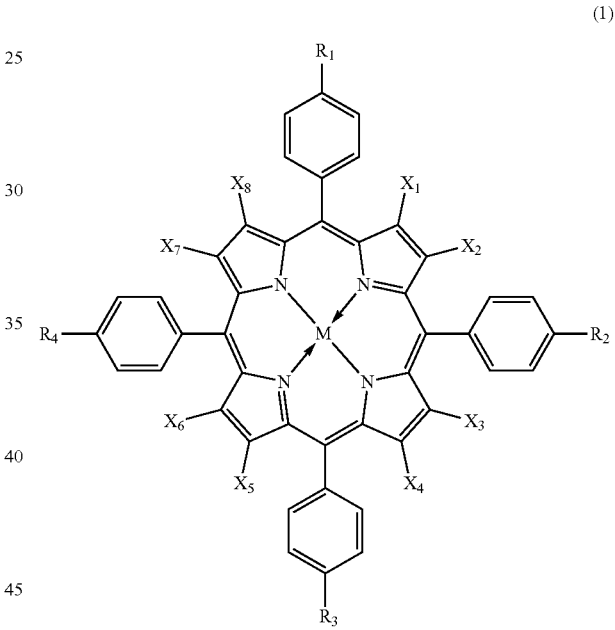

(1)

wherein, in Formula (1), each of $X_1$ to $X_8$ independently represents a hydrogen atom, a linear or branched alkyl group, an ethynyl group, an ethynyl group substituted with a linear or branched alkyl group, an ethynyl group having a phenyl group, or an ethynyl group having a phenyl group substituted with a linear or branched alkyl group, not all of $X_1$ to $X_8$ are hydrogen atoms, each of $R_1$ to $R_4$ independently represents a hydrogen atom or a linear or branched alkyl group, and M represents two hydrogen atoms, a divalent metal atom, a trivalent substituted metal atom, a tetravalent substituted metal atom, a hydroxylated metal atom, or an oxidized metal atom.

<9> The polymerizable composition for an optical material according to <8>, wherein the organic dye (C) contains at least one selected from porphyrin-based compounds represented by the following Formula (1-1) and the following Formula (1-2).

(1-1)

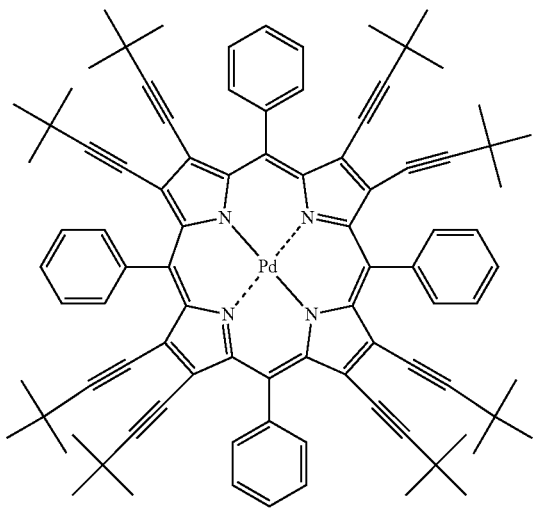

(1-2)

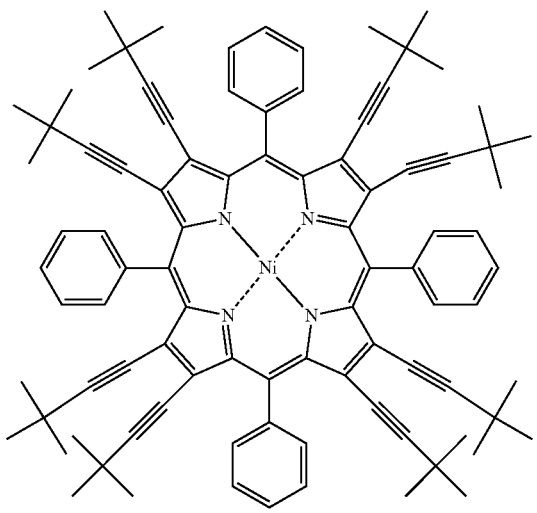

<10> The polymerizable composition for an optical material according to <8> or <9>, wherein the isocyanate compound (A) includes at least one selected from an aliphatic isocyanate compound, an alicyclic isocyanate compound, an aromatic isocyanate compound, a heterocyclic isocyanate compound, or an aromatic aliphatic isocyanate compound.

<11> The polymerizable composition for an optical material according to <10>, wherein the isocyanate compound (A) is at least one selected from the group consisting of xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, bis(isocyanatomethyl)cyclohexane, and dicyclohexylmethane diisocyanate.

<12> The polymerizable composition for an optical material according to any one of <8> to <11>, wherein the polythiol compound is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

<13> The polymerizable composition for an optical material according to any one of <8> to <12>, wherein the organic dye (C) is contained in an amount of from 5 ppm to 50 ppm.

<14> A cured product of the polymerizable composition for an optical material according to any one of <8> to <13>.

<15> An optical material comprising the cured product according to <14>.

<16> A plastic lens comprising the cured product according to <14>.

<17> A method of producing an optical material, the method comprising a process of injecting and polymerizing the polymerizable composition for an optical material according to any one of <8> to <13>.

<18> A method of using the optical material according to any one of <1> to <7> as a lens for reducing migraines.

Advantageous Effects of Invention

According to one embodiment of the disclosure, a transmittance of blue component light in a wavelength range of from 450 to 500 nm is low, and migraine caused by photosensitivity can be reduced.

DESCRIPTION OF EMBODIMENTS

Figure 1:
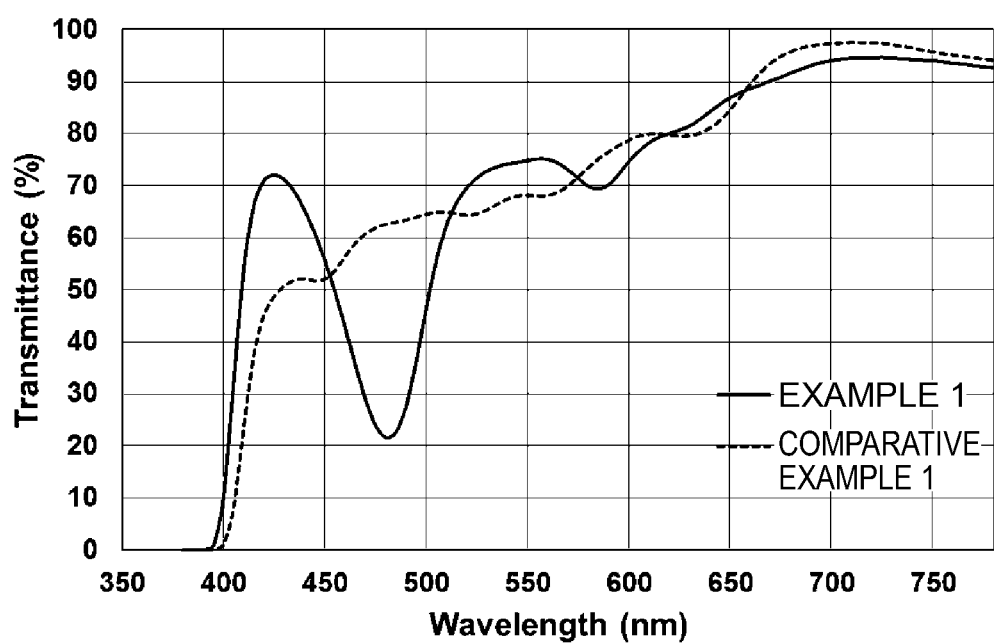
FIG. 1 illustrates a transmittance curve of a plano lens obtained in Example 1.

Herein, each numerical range specified using "(from) . . . to . . . " represents a range including the numerical values noted before and after "to" as the lower limit value and the upper limit value, respectively.

Herein, the amount of each component in a composition means the total amount of the plurality of substances present in the composition, unless otherwise specified, when there is more than one substance corresponding to each component in the composition.

With regard to the stepwise numerical ranges described herein, the upper limit value or the lower limit value described in one numerical range may be replaced with the upper limit value or the lower limit value of another stepwise numerical range. In the numerical ranges described herein, upper limit values or lower limit values of the numerical value ranges may be replaced with values described in Examples.

An optical material of the disclosure is described in detail with reference to embodiments.

In the optical material of the present embodiment, a transmittance curve measured at a thickness of 2 mm satisfies the following characteristics (1) and (2), and a hue in the CIE 1976 ($L^*$, $a^*$, $b^*$) color space measured at the thickness of 2 mm satisfies the following characteristic (3).

(1) The transmittance curve has a maximum value of a transmittance at a wavelength of from 400 nm to 450 nm or from 520 nm to 570 nm, and a largest value of the transmittance at the wavelength of from 400 nm to 450 nm and a transmittance at from 520 nm to 570 nm are 50% or more, and preferably 60% or more.

The "transmittance at from 520 nm to 570 nm" means each of the transmittances in the entire wavelength range of from 520 nm to 570 nm. That is, the "transmittance at from 520 nm to 570 nm is 50% or more, and more preferably 60% or more" means that the transmittance in the entire wavelength range of from 520 nm to 570 nm is 50% or more, and preferably 60% or more.

(2) The transmittance curve has a minimum value of a transmittance at a wavelength of from 470 nm to 500 nm, and the minimum value is 40% or less, and preferably 30% or less.

(3) In the hue in the CIE 1976 ($L^*$, $a^*$, $b^*$) color space, $a^*$ is from 2.5 to 5.5, preferably from 2.8 to 4.5, and more preferably from 3.0 to 4.5, and $b^*$ is from 5 to 25, preferably from 13 to 22, and more preferably from 15 to 22.

In the optical material of the present embodiment, the transmittance curve and the hue satisfy the above ranges, such that migraine can be reduced.

Furthermore, in the optical material of the present embodiment, the following characteristic (4) is preferably satisfied.

(4) A yellow index (YI) is from 25 to 45, and preferably from 30 to 42.

Therefore, the optical material of the present embodiment is also excellent in the hue.

In the optical material of the present embodiment, components contained in the optical material are not particularly limited as long as the characteristics (1) to (3) and further the characteristic (4) can be satisfied, and conventionally known components that can be used in the optical material can be used. The optical material of the present embodiment preferably contains, for example, an organic dye.

[Organic Dye]

The organic dye preferably contains, for example, at least one selected from porphyrin-based compounds represented by the following Formula (1) from the viewpoint of the effects in the disclosure.

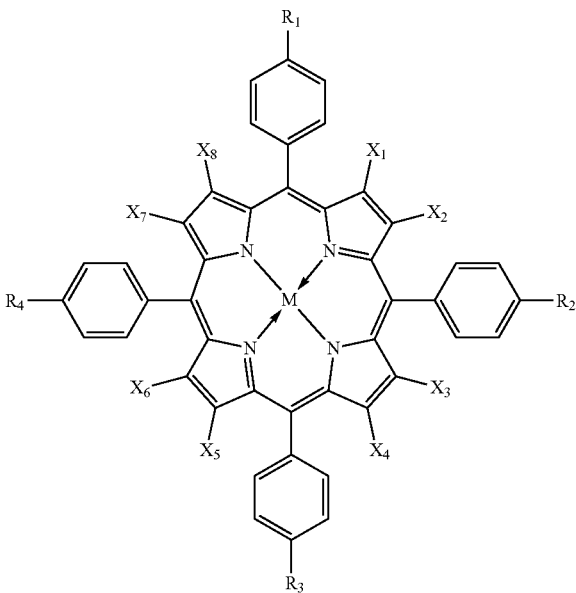

(1)

In Formula (1), each of $X_1$ to $X_8$ independently represents a hydrogen atom, a linear or branched alkyl group, an ethynyl group, an ethynyl group substituted with a linear or branched alkyl group, an ethynyl group having a phenyl group, or an ethynyl group having a phenyl group substituted with a linear or branched alkyl group. Not all of $X_1$ to $X_8$ are hydrogen atoms. Each of $R_1$ to $R_4$ independently represents a hydrogen atom or a linear or branched alkyl group. M represents two hydrogen atoms, a divalent metal atom, a trivalent substituted metal atom, a tetravalent substituted metal atom, a hydroxylated metal atom, or an oxidized metal atom.

Examples of the substituent of the substituted ethynyl group include an alkyl group, and a substituted or unsubstituted phenyl group.

In Formula (1), each of $X_1$ to $X_8$ independently represents a hydrogen atom, a linear or branched alkyl group having from 1 to 12 carbon atoms, an ethynyl group substituted with a linear or branched alkyl group having from 1 to 12 carbon atoms, an ethynyl group having a phenyl group substituted with a linear or branched alkyl group having from 1 to 12 carbon atoms, or an ethynyl group having an unsubstituted phenyl group. Not all of $X_1$ to $X_8$ are hydrogen atoms.

Preferably, each of $R_1$ to $R_4$ independently represents a hydrogen atom, or a linear or branched alkyl group having from 1 to 8 carbon atoms.

M is preferably Cu, Zn, Fe, Co, Ni, Pt, Pd, Mn, Mg, Mn(OH), Mn(OH)$_2$, VO, or TiO.

More preferably, each of $X_1$ to $X_8$ independently represents a hydrogen atom, a linear or branched alkyl group having from 1 to 8 carbon atoms, an ethynyl group substituted with a linear or branched alkyl group having from 1 to 8 carbon atoms, or an ethynyl group having a phenyl group substituted with a linear or branched alkyl group having from 1 to 6 carbon atoms.

M is more preferably Cu, Pt, Pd, Ni, or VO and still more preferably Ni or Pd.

Specific examples of $X_1$ to $X_8$ are described below.

In a case where $X_1$ to $X_8$ are linear or branched alkyl groups, examples of the linear or branched alkyl groups include a methyl group, an ethyl group, an n-propyl group, an isopropyl group, an n-butyl group, an isobutyl group, a tert-butyl group, an n-pentyl group, an isopentyl group, a neopentyl group, a tert-pentyl group, a 1,2-dimethylpropyl group, a 1-methylbutyl group, a 2-methylbutyl group, an n-hexyl group, a 2-methylpentyl group, a 4-methylpentyl group, a 4-methyl-2-pentyl group, a 1,2-dimethylbutyl group, a 2,3-dimethylbutyl group, a 2-ethylbutyl group, an n-heptyl group, a 3-methylhexyl group, a 5-methylhexyl group, a 2,4-dimethyl pentyl group, an n-octyl group, a tert-octyl group, a 2-ethylhexyl group, a 2-propylpentyl group, and a 2,5-dimethylhexyl group.

Among them, a methyl group, an ethyl group, an n-propyl group, an isopropyl group, an n-butyl group, an isobutyl group, a tert-butyl group, an n-pentyl group, an isopentyl group, a neopentyl group, a 1,2-dimethylpropyl group, a 1-methylbutyl group, an n-hexyl group, a 1,2-dimethylbutyl group, a 2-ethylbutyl group, an n-heptyl group, an n-octyl group, or a 2-ethylhexyl group is preferable, and a methyl group, an ethyl group, an n-propyl group, an isopropyl group, an n-butyl group, an isobutyl group, a tert-butyl group, an n-pentyl group, an isopentyl group, an n-hexyl group, a 1,2-dimethylbutyl group, a 2-ethylbutyl group, an n-heptyl group, or an n-octyl group is more preferable.

In a case where $X_1$ to $X_8$ are substituted ethynyl groups, examples of the substituted ethynyl groups include an ethynyl group having, as a substituent, a linear or branched alkyl group such as a methyl group, an ethyl group, an n-propyl group, an isopropyl group, an n-butyl group, an isobutyl group, a tert-butyl group, an n-pentyl group, an isopentyl group, a neopentyl group, a tert-pentyl group, a 1,2-dimethylpropyl group, a 1-methylbutyl group, a 2-methylbutyl group, an n-hexyl group, a 2-methylpentyl group, a 4-methylpentyl group, a 4-methyl-2-pentyl group, a 1,2-dimethylbutyl group, a 2,3-dimethylbutyl group, a 2-ethylbutyl group, an n-heptyl group, a 3-methylhexyl group, a 5-methylhexyl group, a 2,4-dimethyl pentyl group, an n-octyl group, a tert-octyl group, a 2-ethylhexyl group, a 2-propylpentyl group, or a 2,5-dimethylhexyl group; an ethynyl group having an unsubstituted phenyl group as a substituent; and an ethynyl group having, as a substituent, a phenyl group substituted with a linear or branched alkyl group, such as a 2-methylphenyl group, a 4-methylphenyl group, a 3-ethylphenyl group, a 4-n-propylphenyl group, a 4-n-butylphenyl group, a 4-isobutylphenyl group, a 4-tert-butylphenyl group, a 4-n-pentylphenyl group, a 4-tert-pentylphenyl group, a 4-n-hexylphenyl group, a 4-n-octylphenyl group, or a 4-n-nonylphenyl group.

Among them, an ethynyl group having, as a substituent, a linear or branched alkyl group such as a methyl group, an ethyl group, an n-propyl group, an isopropyl group, an n-butyl group, an isobutyl group, a tert-butyl group, an n-pentyl group, an isopentyl group, an n-hexyl group, a 1,2-dimethylbutyl group, a 2-ethylbutyl group, an n-heptyl group, or an n-octyl group; an ethynyl group having a phenyl group as a substituent; or an ethynyl group having, as a substituent, a phenyl group substituted with a linear or branched alkyl group, such as a 2-methylphenyl group, a 4-methylphenyl group, a 3-ethylphenyl group, a 4-n-propylphenyl group, a 4-n-butylphenyl group, a 4-isobutylphenyl group, a 4-tert-butylphenyl group, a 4-n-pentylphenyl group, or a 4-tert-pentylphenyl group is more preferable.

In a case where $R_1$ to $R_4$ are linear or branched alkyl groups, examples of the linear or branched alkyl groups include a methyl group, an ethyl group, an n-propyl group, an isopropyl group, an n-butyl group, an isobutyl group, a tert-butyl group, an n-pentyl group, an isopentyl group, a neopentyl group, a tert-pentyl group, a 1,2-dimethylpropyl group, a 1-methylbutyl group, a 2-methylbutyl group, an n-hexyl group, a 2-methylpentyl group, a 4-methylpentyl group, a 4-methyl-2-pentyl group, a 1,2-dimethylbutyl group, a 2,3-dimethylbutyl group, a 2-ethylbutyl group, an n-heptyl group, a 3-methylhexyl group, a 5-methylhexyl group, a 2,4-dimethyl pentyl group, an n-octyl group, a tert-octyl group, a 2-ethylhexyl group, a 2-propylpentyl group, and a 2,5-dimethylhexyl group.

Among them, a methyl group, an ethyl group, an n-propyl group, an isopropyl group, an n-butyl group, an isobutyl group, a tert-butyl group, an n-pentyl group, an isopentyl group, a neopentyl group, a 1,2-dimethylpropyl group, a 1-methylbutyl group, an n-hexyl group, a 1,2-dimethylbutyl group, a 2-ethylbutyl group, an n-heptyl group, an n-octyl group, or a 2-ethylhexyl group is preferable, and a methyl group, an ethyl group, an n-propyl group, an isopropyl group, an n-butyl group, an isobutyl group, a tert-butyl group, an n-pentyl group, an isopentyl group, an n-hexyl group, a 1,2-dimethylbutyl group, a 2-ethylbutyl group, an n-heptyl group, or an n-octyl group is more preferable.

Such a porphyrin-based compound used in the optical material of the present embodiment can satisfy the characteristics (1) to (3) and further the characteristic (4), and can reduce migraine caused by photosensitivity.

The porphyrin-based compound used in the optical material of the present embodiment can be produced with reference to a well-known method itself. That is, the compound represented by Formula (1) can be produced by, for example, synthesizing compounds represented by Formula (a-1) to Formula (a-4) and compounds represented by Formula (b-1) to Formula (b-4) through a dehydration condensation reaction and an oxidation reaction (for example, 2,3-dichloro-5,6-dicyano-1,4-benzoquinone), which is a so-called Rothermunt reaction, using an acid catalyst (for example, propionic acid, a boron trifluoride-ethyl ether complex, or trifluoroacetic acid), and by reacting the synthesized compounds with a metal or a metal salt (for example, an acetylacetonate complex or a metal acetate) in an appropriate solvent, if desired.

(a-1)

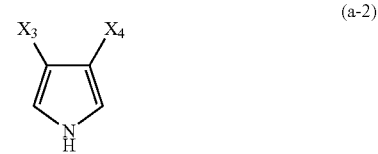

(a-2)

(a-3)

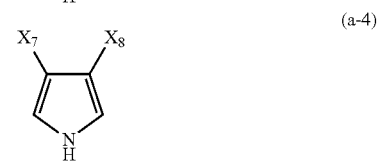

(a-4)

-continued (b-1)

R₁—⟨C₆H₄⟩—CHO (b-2)

R₂—⟨C₆H₄⟩—CHO (b-3)

R₃—⟨C₆H₄⟩—CHO (b-4)

R₄—⟨C₆H₄⟩—CHO

In the formulas, $X_1$ to $X_8$ and $R_1$ to $R_4$ have the same meanings as in the case of Formula (1).

Herein, the porphyrin-based compound represented by Formula (1) actually represents a mixture composed of one or two or more isomers. Even when describing a structure of such a mixture composed of a plurality of isomers, herein, one structural formula represented by Formula (1) is described for convenience, for example.

In the disclosure, the porphyrin-based compound has a maximum absorption peak in a wavelength range of from 470 nm to 500 nm in an absorption spectrum measured at an optical path length of 10 mm of a chloroform solution having a concentration of 0.01 g/L.

In the present embodiment, the porphyrin-based compound is preferably a compound represented by the following Formula (1-1) or the following Formula (1-2). Migraine caused by photosensitivity can be further reduced by using these compounds.

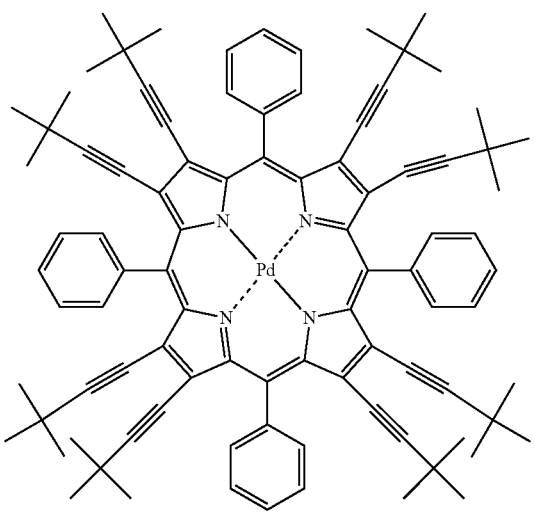

(1-1)

-continued

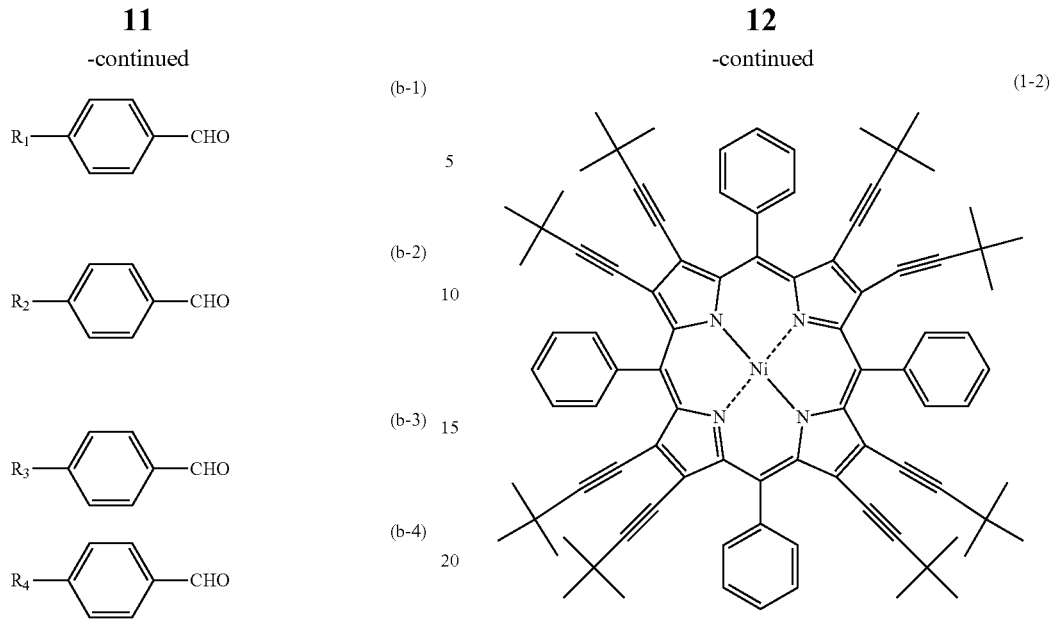

(1-2)

In the optical material of the present embodiment, a mixture composed of one or two or more isomers can be used as the porphyrin-based compound. In addition, each isomer can be separated from the mixture, and one kind of compound among the isomers can be used, and further, a plurality of isomers formed at arbitrary proportions can be used in combination, if desired. The porphyrin-based compound according to the present embodiment includes not only crystals but also amorphous forms.

The amount of organic dye in the optical material is not particularly limited as long as it satisfies the above characteristics, but in the optical material of the present embodiment, the organic dye can be contained in an amount of from 5 ppm to 50 ppm, preferably from 10 ppm to 25 ppm, and more preferably from 12 ppm to 22 ppm, from the viewpoint of the effects in the disclosure.

In the disclosure, "ppm" is on a mass basis.

In the optical material of the present embodiment, the porphyrin-based compound represented by Formula (1) can be contained in an amount of from 5 ppm to 50 ppm, preferably from 10 ppm to 25 ppm, and more preferably from 12 ppm to 22 ppm.

The optical material of the present embodiment has the characteristics (1) to (3), and more preferably the characteristic (4), the characteristics being measured at the thickness of 2 mm. The optical material of the present embodiment preferably contains at least one selected from porphyrin-based compounds represented by Formula (1) as an organic dye.

As the organic dye, the porphyrin-based compounds may be used singly, or in combination of two or more kinds thereof.

[Color Tone Adjusting Agent]

The optical material of the present embodiment preferably further contains a color tone adjusting agent.

The color tone adjusting agent can be selected from conventionally known color tone adjusting agents as long as the effects in the disclosure can be exhibited.

Examples of the color tone adjusting agent include an anthraquinone-based dye, a perinone-based dye, a monoazo-based dye, a diazo-based dye, and a phthalocyanine-based dye. The color tone adjusting agents may be used singly, or in combination of two or more kinds thereof.

Examples of the anthraquinone-based dye include Solvent Blue 36 (1,4-bis(isopropylamino)anthracene-9,10-dione), Solvent Blue 63 (1-(methylamino)-4-(m-tolylamino)anthracene-9,10-dione), Solvent Blue 94 (1-amino-2-bromo-4-(phenylamino)anthracene-9,10-dione), Solvent Blue 97 (1,4-bis((2,6-diethyl-4-methylphenyl)amino)anthracene-9,10-dione), Solvent Blue 104 (1,4-bis(mesitylamino)anthracene-9,10-dione), Solvent Violet 13 (1-hydroxy-4-(p-tolylamino)anthracene-9,10-dione), Solvent Violet 13 (1,5-bis (p-tolylamino)anthracene-9,10-dione), Solvent Red 52 (3-methyl-6-(p-tolylamino)-3H-naphtho[1,2,3-de]quinoline-2,7-dione), Solvent Red 168 or Plast Red 8320 (1-(cyclohexylamino)anthracene-9,10-dione), Solvent Red 207 (1,5-bis(cyclohexylamino)anthracene-9,10-dione), Disperse Red 22 (1-(phenylamino) anthracene-9,10-dione), Disperse Red 60 (1-amino-4-hydroxy-2-phenoxy anthracene-9,10-dione), Solvent Violet 59 (1,4-diamino-2,3-diphenylanthracene-9,10-dione), Solvent Green 28 (1,4-bis((4-butylphenyl)amino)-5,8-dihydroxyanthracene-9,10-dione), and Plast Blue 8514 (1-hydroxy-4-[(4-metylphenyl)amino]-9,10-anthracene dione).

Examples of the perinone-based dye include Solvent Orange 60 (12H-isoindolo[2,1-a]perimidin-12-one), Solvent Orange 78, Solvent Orange 90, Solvent Red 135 (8,9,10,11-tetrachloro-12H-isoindolo[2,1-a]perimidin-12-one), Solvent Red 162, and Solvent Red 179 (14H-benzo[4,5]isoquinolino[2,1-a]perimidin-14-one).

Examples of the monoazo-based dye include Solvent Red 195, Fast Orange R, Oil Red, and Oil Yellow.

Examples of the diazo-based dye include Chicago Sky Blue 6B (sodium 6,6'-((1E,1'E)-(3,3'-dimethoxy-[1,1'-biphenyl]-4,4'-diyl)bis(diazene-2,1-diyl))bis(4-amino-5-hydroxynaphthalene-1,3-disulfonate)), Evans Blue (sodium 6,6'-((1E,1'E)-(3,3'-dimethyl-[1,1'-biphenyl]-4,4'-diyl)bis (diazene-2,1-diyl))bis(4-amino-5-hydroxynaphthalene-1,3-disulfonate)), Direct Blue 15 (sodium 3,3'-((1E,1'E)-(3,3'-dimethoxy-[1,1'-biphenyl]-4,4'-diyl)bis(diazene-2,1-diyl)) bis(5-amino-4-hydroxynaphthalene-2,7-disulfonate)), Trypan Blue (sodium 3,3'-((1E,1'E)-(3,3'-dimethyl-[1,1'-biphenyl]-4,4'-diyl)bis(diazene-2,1-diyl))bis(5-amino-4-hydroxynaphthalene-2,7-disulfonate)), Benzopurpurin 4B (sodium 3,3'-((1E,1'E)-(3,3'-dimethyl-[1,1'-biphenyl]-4,4'-diyl) bis(diazene-2,1-diyl))bis(4-aminonaphthalene-1-sulfonate)), and Congo Red (sodium 3,3'-((1E,1'E)-[1,1'-biphenyl]-4,4'-diylbis(diazene-2,1-diyl))bis(4-aminonaphthalene-1-sulfonate)).

Examples of the phthalocyanine-based dye include C.I. Direct Blue 86 and C.I. Direct Blue 199.

In the present embodiment, Solvent Blue 94, Solvent Blue 97, Solvent Blue 104, Solvent Violet 59, Solvent Red 195, Disperse Red 60, Solvent Green 28, Solvent Orange 60, Plast Blue 8514, or Plast Red 8320 is preferable, and Plast Blue 8514 or Plast Red 8320 is more preferable, from the viewpoint of the effects in the disclosure. These color tone adjusting agents may be used singly, or in combination of two or more kinds thereof, and these color tone adjusting agents are preferably used in combination of two or more kinds thereof.

The optical material of the present embodiment can contain the organic dye in the above amount, and can contain the color tone adjusting agent in an amount of from 3 ppm to 20 ppm, and preferably from 5 ppm to 15 ppm.

Therefore, the optical material of the present embodiment is also excellent in the hue.

[Resin]

The optical material of the present embodiment preferably further contains a resin.

The resin is not particularly limited as long as the effects in the disclosure can be exhibited, and can be selected from known transparent resins that can be used in the optical material.

Examples of the resin include poly(thio)urethane, poly (thio)urethane urea, polysulfide, polycarbonate, poly(meth) acrylate, and polyolefin, and poly(thio)urethane or poly (thio)urethane urea is preferable. At least one selected from these resins can be used as the resin.

Hereinafter, a composition used for preparing an optical material is described. In the present embodiment, a polymerizable composition that is used for preparing an optical material and contains poly(thio)urethane or poly(thio)urethane urea as a resin is described.

[Polymerizable Composition for Optical Materials]

The polymerizable composition for optical materials of the present embodiment contains:

an isocyanate compound (A);

at least one active hydrogen compound (B) selected from the group consisting of a polythiol compound having two or more mercapto groups, a hydroxythiol compound having one or more mercapto groups and one or more hydroxyl groups, a polyol compound having two or more hydroxyl groups, and an amine compound; and an organic dye (C) containing at least one selected from porphyrin-based compounds represented by Formula (1).

The organic dye described above can be used as the organic dye (C).

The amount of organic dye (C) in the optical material is not particularly limited as long as it satisfies the above characteristics, and in the polymerizable composition for optical materials of the present embodiment, the organic dye can be contained in an amount of from 5 ppm to 50 ppm, preferably from 10 ppm to 25 ppm, and more preferably from 12 ppm to 22 ppm, from the viewpoint of the effects in the disclosure.

In the polymerizable composition for optical materials of the present embodiment, the porphyrin-based compound represented by Formula (1) can be contained in an amount of from 5 ppm to 50 ppm, preferably from 10 ppm to 25 ppm, and more preferably from 12 ppm to 22 ppm.

The polymerizable composition for optical materials of the present embodiment preferably further contains a color tone adjusting agent (D). The color tone adjusting agent described above can be used as the color tone adjusting agent (D).

The polymerizable composition for optical materials of the present embodiment can contain the organic dye in the above amount, and can contain the color tone adjusting agent in an amount of from 3 ppm to 20 ppm, and preferably from 5 ppm to 15 ppm.

Therefore, by using the polymerizable composition for optical materials of the present embodiment, migraine can be more reduced, and an optical material excellent in the hue can be obtained.

[Isocyanate Compound (A)]

Examples of the isocyanate compound (A) can include an aliphatic isocyanate compound, an alicyclic isocyanate compound, an aromatic isocyanate compound, a heterocyclic isocyanate compound, and an aromatic aliphatic isocyanate compound, and these isocyanate compounds (A) may be used singly, or in a mixture of two or more kinds thereof. These isocyanate compounds may contain a dimer, a trimer, and a prepolymer.

Examples of these isocyanate compounds include compounds exemplified in WO2011/055540.

In the present embodiment, from the viewpoint of the effects in the disclosure, the isocyanate compound (A) preferably contains at least one selected from the group consisting of xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, bis(isocyanatomethyl)cyclohexane, and dicyclohexylmethane diisocyanate, and more preferably contains at least one selected from the group consisting of xylylene diisocyanate, tolylene diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, bis(isocyanatomethyl)cyclohexane, and dicyclohexylmethane diisocyanate.

(Active Hydrogen Compound (B))

In the present embodiment, as the active hydrogen compound (B), at least one selected from the group consisting of a polythiol compound having two or more mercapto groups, a hydroxythiol compound having one or more mercapto groups and one or more hydroxyl groups, a polyol compound having two or more hydroxyl groups, and an amine compound can be used.

Examples of these active hydrogen compounds include compounds exemplified in WO2016/125736.

The active hydrogen compound (B) is preferably at least one selected from the group consisting of a polythiol compound having two or more mercapto groups and a hydroxythiol compound having one or more mercapto groups and one or more hydroxyl groups, and more preferably at least one selected from polythiol compounds having two or more mercapto groups, from the viewpoint of the effects in the disclosure.

The polythiol compound is preferably at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate), and
   is more preferably at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

In the present embodiment, a molar ratio of an active hydrogen group in the active hydrogen compound (B) to an isocyanato group in the isocyanate compound (A) is from 0.8 to 1.2, preferably from 0.85 to 1.15, and more preferably from 0.9 to 1.1. Within the above range, a resin suitably used as an optical material, particularly a plastic lens material for glasses can be obtained.

Examples of an optional additive include a polymerization catalyst, an internal mold release agent, and an ultraviolet absorber. In the present embodiment, when polyurethane and polythiourethane are obtained, a polymerization catalyst may or may not be used.

An example of the internal mold release agent includes an acidic phosphoric acid ester. Examples of the acidic phosphoric acid ester include a phosphoric acid monoester and a phosphoric acid diester, and the acidic phosphoric acid esters can be used singly, or in a mixture of two or more kinds thereof.

Examples of the ultraviolet absorber include a benzophenone ultraviolet absorber, a triazine ultraviolet absorber, and a benzotriazole ultraviolet absorber, and preferably include a benzotriazole ultraviolet absorber such as 2-(2H-benzotriazol-2-yl)-4-tert-octylphenol or 2-(5-chloro-2H-benzotriazol-2-yl)-4-methyl-6-tert-butylphenol. These ultraviolet absorbers may be used singly, or in combination of two or more kinds thereof.

The composition for optical materials can be obtained by mixing the above components by a predetermined method.

The order and method of mixing the components in the composition are not particularly limited as long as the components can be uniformly mixed, and the mixing can be performed by a known method. An example of the known method includes a method of preparing a masterbatch containing a predetermined amount of an additive, and dispersing and dissolving the masterbatch in a solvent. For example, in the case of a polyurethane resin, a method of preparing a masterbatch by dispersing and dissolving an additive in a polyisocyanate compound is used.

A molded body containing an organic dye can be obtained by a method of mixing and polymerizing compositions for optical materials containing an organic dye and a resin monomer for optical materials, or a method of curing a composition for optical materials containing an organic dye and a resin for optical materials.

<Cured Product>

Using the polymerizable composition for optical materials of the present embodiment, a cured product can be obtained by polymerization, and cured products having various shapes depending on the shape of a mold can be obtained. Examples of the polymerization method include conventionally known methods, and conditions thereof are not particularly limited.

In the present embodiment, a method of producing a cured product is not particularly limited, and an example of a preferable production method includes a casting polymerization method. First, the polymerizable composition for optical materials is injected between molding molds held with a gasket, a tape, or the like. At this time, depending on the physical properties required for a cured product to be obtained, it is preferable to perform a defoaming treatment under reduced pressure or a filtration treatment under pressure or reduced pressure, or the like, if necessary.

Since the polymerization conditions vary depending on the types and use amounts of the components (A) to (C) and further the component (D), the type and use amount of the catalyst, the shape of the mold, and the like, the polymerization conditions are not limited, and the polymerization is performed at a temperature of from −50° C. to 150° C. for from 1 hour to 50 hours. In some cases, it is preferable to maintain or gradually raise the temperature in a temperature range of from 10° C. to 150° C., and to cure the composition for from 1 hour to 25 hours.

The cured product of the present embodiment may be subjected to a treatment such as annealing, if necessary. The treatment temperature is usually from 50° C. to 150° C., but is preferably from 90° C. to 140° C. and more preferably from 100° C. to 130° C.

In addition, in the present embodiment, the cured product obtained by heating and curing the polymerizable composition for optical materials can be used as, for example, an optical material, and can constitute a part of the optical material. The cured product of the present embodiment is colorless and transparent, has an excellent appearance, and has an excellent effect of blocking blue component light in a wavelength region of from 450 to 500 nm. Therefore, migraine can be reduced. The cured product is excellent in various physical properties such as optical properties, for example, a high refractive index, a high Abbe number, and the like, and heat resistance, and can be used as various optical materials by forming the cured product into a desired shape and including a coating layer to be formed, if necessary, or other members.

<Optical Material>

The optical material of the present embodiment includes a cured product. Specifically, the optical material of the present embodiment includes a lens substrate, film layer, or coating layer formed of a cured product.

Representative examples of the configuration of the optical material include an optical material composed of a lens substrate, an optical material composed of a lens substrate and a film layer, an optical material composed of a lens substrate and a coating layer, and an optical material composed of a lens substrate, a film layer, and a coating layer.

Specific examples of the optical material of the present embodiment include an optical material composed only of a lens substrate, an optical material formed by laminating a film layer on at least one surface of a lens substrate, an optical material formed by laminating a coating layer on at least one surface of a lens substrate, an optical material formed by laminating a film layer and a coating layer on at least one surface of a lens substrate, and an optical material formed by sandwiching a film layer between two lens substrates.

The optical material of the present embodiment has the characteristics (1) to (3) in the entire optical material, and preferably further has the characteristic (4).

For example, a molded body (a lens substrate or an optical film) is prepared using a composition for optical materials containing no organic dye, and then, the molded body is immersed in a dispersion liquid obtained by dispersing the organic dye in water or a solvent to impregnate the molded body with the organic dye, and the molded body is dried. An optical material can be prepared using the molded body thus obtained.

In addition, it is also possible to impregnate the optical material with the porphyrin-based compound represented by Formula (1) after preparing the optical material. In addition, a plastic spectacle lens including a lens substrate, and if necessary, a film layer and a coating layer laminated can be immersed in a dispersion liquid containing an organic dye to be impregnated with the organic dye.

The impregnation amount of the organic dye can be controlled to a desired impregnation amount by the concentration of the organic dye in the dispersion liquid, the temperature of the dispersion liquid, and the time for immersing the resin composition for optical materials. The higher the concentration, the higher the temperature, and the longer the immersion time, the larger the impregnation amount. When it is desired to precisely control the impregnation amount, the immersion is repeated a plurality of times under the condition of a small impregnation amount.

It is also possible to form an organic dye-containing coating layer on a plastic lens substrate using a coating material containing an organic dye.

The optical material having such a configuration can be suitably used as a plastic spectacle lens. The disclosure is not limited to the above-described embodiments, and various aspects can be taken as long as the effects of the invention are not impaired.

For example, when in the optical material, the characteristics (1) to (3) are satisfied and the characteristic (4) is further preferably satisfied, an optical material can be obtained without using the "polymerizable composition for optical materials containing the porphyrin-based compound represented by Formula (1)" of the embodiment described above.

Hereinafter, a plastic lens which is a preferable aspect of the optical material is described in detail.

[Plastic Lens]

The plastic lens can have the following configurations by way of example.

(1) A plastic lens including a lens substrate obtained from the composition for optical materials of the present embodiment (2) A plastic lens including a lens substrate, film, or coating layer obtained from the composition for optical materials of the present embodiment, in which the film or coating layer is formed on at least one surface of a lens substrate (here, the lens substrate obtained from the composition for optical materials of the present embodiment is excluded)

(3) A plastic lens in which a lens substrate (here, the lens substrate obtained from the composition for optical materials of the present embodiment is excluded) is laminated on both surfaces of a film formed of the composition for optical materials of the present embodiment In the present embodiment, these plastic lenses can be suitably used.

Hereinafter, each embodiment is described.

First Embodiment

A method of producing a plastic lens including a lens substrate obtained from the composition for optical materials of the present embodiment is not particularly limited, and an example of a preferable production method includes a casting polymerization method using a lens casting mold. The lens substrate can be formed of polyurethane, polythiourethane, polyurethane urea, polythiourethane urea, polysulfide, poly(meth)acrylate, or the like, and the composition for optical materials of the present embodiment containing an organic dye and monomers of these resins (resin monomers for optical materials) can be used.

Specifically, the composition for optical materials is injected into a cavity of a molding mold held with a gasket, a tape, or the like. At this time, depending on the physical properties required for a plastic lens to be obtained, it is preferable to perform a defoaming treatment under reduced pressure or a filtration treatment under pressure or reduced pressure, or the like, if necessary.

After the composition is injected, a lens casting mold is heated in a predetermined temperature program in a heatable device such as an oven or water, and the composition is cured and molded. The resin molded body may be subjected to a treatment such as annealing, if necessary.

In the present embodiment, when molding the resin, in addition to the "optional additives", various additives such as a chain extender, a crosslinking agent, a light stabilizer, an antioxidant, an oil-soluble dye, a filler, and an adhesion improver may be added as in the known molding method according to the purpose.

The plastic lens in the present embodiment may include various coating layers formed on the lens substrate obtained from the composition for optical materials of the present embodiment according to its purpose and use. The coating layer can contain an organic dye. The coating layer containing an organic dye can be prepared using a coating material (composition) containing an organic dye, or can be prepared by immersing a plastic lens with a coating layer in a dispersion liquid obtained by dispersing an organic dye in water or a solvent after forming the coating layer and impregnating the coating layer with the organic dye.

Second Embodiment

A plastic lens in the present embodiment includes a lens substrate, film, or coating layer obtained from the composition for optical materials of the present embodiment, in which the lens substrate, film, or coating layer is formed on at least one surface of a lens substrate other than the lens substrate obtained from the composition for optical materials of the present embodiment. The lens substrate is not formed of the composition for optical materials of the present embodiment.

Examples of the method of producing the plastic lens in the present embodiment include a method (2-1) of producing a lens substrate different from the lens substrate obtained from the composition for optical materials of the present embodiment, and then bonding a lens substrate, film, or sheet obtained from the composition for optical materials of the present embodiment to at least one surface of the lens substrate, and a method (2-2) of arranging a film or sheet formed of the composition for optical materials of the present embodiment along one inner wall of a mold in a cavity of a molding mold held by a gasket, a tape, or the like as described below, and then injecting the composition for optical materials into the cavity and curing the composition for optical materials.

The film or sheet formed of the composition for optical materials of the present embodiment used in the method (2-1) is not particularly limited, but pellets of the composition for optical materials obtained by melt-kneading, impregnation, or the like can be obtained by various conventionally known methods, specifically, for example, molding methods such as an injection molding method, a profile extrusion molding method, a coating molding method for a dissimilar molded body, a T-die sheet or film molding method, an inflation film molding method, and a press molding method. The obtained film or sheet contains polycarbonate, polyolefin, or the like.

The lens substrate can be obtained from a known optical resin, and examples of the optical resin include (thio) urethane and polysulfide.

A known method can be used as a method of bonding the film or sheet formed of the composition for optical materials of the present embodiment to the surface of the lens substrate.

The casting polymerization in the method (2-2) can be performed in the same manner as that of the method of producing the plastic lens in the first embodiment, and an example of the composition used for the casting polymerization includes a composition containing a resin monomer for optical materials (containing no organic dye).

The plastic lens in the present embodiment may include various coating layers formed on the lens substrate, film, or layer obtained from the composition for optical materials according to its purpose and use. The coating layer can contain an organic dye as in the plastic lens in the first embodiment.

Third Embodiment

In a plastic lens in the present embodiment, a lens substrate (the lens substrate obtained from the composition for optical materials of the present embodiment is excluded) is laminated on both surfaces of a film formed of the composition for optical materials of the present embodiment.

Examples of the method of producing the plastic lens in the present embodiment include a method (3-1) of producing a lens substrate and bonding the lens substrate to both surfaces of a film or sheet formed of the composition for optical materials of the present embodiment, and a method (3-2) of arranging a film or sheet formed of the composition for optical materials of the present embodiment in a cavity of a molding mold held by a gasket, a tape, or the like in a state of being separated from an inner wall of the mold, and then injecting the composition for optical materials into the cavity and curing the composition for optical materials.

As the film or sheet formed of the composition for optical materials of the present embodiment and the lens substrate that are used in the method (3-1), the film, sheet, and lens substrate similar to those of the method (2-1) of producing the plastic lens in the second embodiment can be used.

A known method can be used as a method of bonding the film or sheet formed of the composition for optical materials of the present embodiment to the surface of the lens substrate.

The method (3-2) can be specifically performed as follows.

In the space of the lens casting mold used in the method of producing the plastic lens in the first embodiment, the film or sheet formed of the composition for optical materials of the present embodiment is arranged so that both surfaces thereof are parallel to the inner surface of the mold on the front side facing the both surfaces.

Next, in the space of the lens casting mold, a composition containing a resin monomer for optical materials (containing no organic dye) is injected into two void portions between the mold and a polarizing film by predetermined injection means.

After the composition is injected, a lens casting mold is heated in a predetermined temperature program in a heatable device such as an oven or water, and the composition is cured and molded. The resin molded body may be subjected to a treatment such as annealing, if necessary.

The plastic lens in the present embodiment may include various coating layers formed on the lens substrate according to its purpose and use. The coating layer can contain an organic dye as in the plastic lens in the first embodiment.

[Plastic Spectacle Lens]

A plastic spectacle lens can be obtained using the plastic lens of the present embodiment. A coating layer may be applied to one surface or both surfaces, if necessary.

Specific examples of the coating layer include a primer layer, a hard coating layer, an anti-reflection layer, an anti-fogging coating layer, an anti-fouling layer, and a water-repellent layer. These coating layers can be used alone, or a plurality of coating layers can be used in a multi-layer manner. In a case where the coating layer is applied to both surfaces, the same coating layers or different coating layers may be applied to the both surfaces, respectively.

For each of the coating layers, an organic dye used in the present embodiment, an infrared absorber for protecting eyes from infrared rays, a light stabilizer or an antioxidant for improving weather resistance of the lens, a dye or a pigment for improving the fashion of the lens, a photochromic dye or a photochromic pigment, an antistatic agent, and other known additives for improving the performance of the lens may be used in combination. For the layer to be coated by coating, various leveling agents for improving coatability may be used.

The primer layer is usually formed between a hard coating layer described below and a lens. The primer layer is a coating layer intended to improve adhesion between the hard coating layer formed thereon and the lens, and it is also possible to improve impact resistance in some cases. For the primer layer, any material can be used as long as it has high adhesion to the obtained lens, but a primer composition containing a urethane-based resin, an epoxy-based resin, a polyester-based resin, a melamine-based resin, or polyvinyl acetal as a main component is usually used. For the primer layer, a suitable solvent that does not affect the lens may be used to adjust a viscosity of the composition. A solvent may not be used.

The primer layer can be formed by either a coating method or a dry method. In a case where a coating method is used, a primer composition is applied to a lens by a known application method such as a spin coating method or a dip coating method, and then, the primer composition is solidified and a primer layer is thus formed. In a case where the primer layer is formed by a dry method, the primer layer is formed by a known dry method such as a CVD method or a vacuum vapor deposition method. When forming the primer layer, the surface of the lens may be subjected to a pre-treatment such as an alkali treatment, a plasma treatment, or an ultraviolet treatment, if necessary, to improve adhesion.

The hard coating layer is a coating layer intended to impart functions such as scratch resistance, abrasion resistance, moisture resistance, hot water resistance, heat resistance, and weather resistance to the surface of the lens.

In general, a hard coating composition is used for the hard coating layer, the hard coating composition containing an organosilicon compound having curability, and at least one of an oxide of one or more elements selected from the group consisting of Si, Al, Sn, Sb, Ta, Ce, La, Fe, Zn, W, Zr, In, and Ti, and a composite oxide of two or more elements selected from the group consisting of Si, Al, Sn, Sb, Ta, Ce, La, Fe, Zn, W, Zr, In, and Ti.

In addition to the above components, the hard coating composition preferably contains at least one selected from the group consisting of an amine, an amino acid, a metal acetylacetonate complex, a metal organic acid salt, a perchloric acid, a salt of a perchloric acid, an acid, a metal chloride, and a polyfunctional epoxy compound. For the hard coating composition, an appropriate solvent that does not affect the lens may be used, or a solvent may not be used.

The hard coating layer is usually formed by applying a hard coating composition by a known application method such as a spin coating method or a dip coating method and curing the hard coating composition. Examples of the curing method include a thermal curing method and a curing method by irradiation with energy rays such as ultraviolet rays and visible rays. In order to suppress the occurrence of interference fringes, a difference between a refractive index of the hard coating layer and a refractive index of the lens is preferably in the range of ±0.1.

The anti-reflection layer is usually formed on the hard coating layer, if necessary. The anti-reflection layer includes an inorganic system and an organic system, and in the case of the inorganic system, the anti-reflection layer is formed using an inorganic oxide such as $SiO_2$ or $TiO_2$ by a dry method such as a vacuum vapor decomposition method, a sputtering method, an ion plating method, an ion beam assist method, or a CVD method. In the case of the organic system, the anti-reflection layer is formed using a composition containing an organosilicon compound and silica-based fine particles having internal cavities by a wet manner.

The anti-reflection layer includes a single layer and a multi-layer, and in a case of using a single layer, it is preferable that a refractive index of the anti-reflection layer is lower than a refractive index of the hard coating layer by at least 0.1 or more. In order to effectively exhibit the anti-reflection function, it is preferable to form a multi-layer anti-reflection film. In this case, a low refractive film and a high refractive film are alternately laminated. In this case, a refractive index difference between the low refractive film and the high refractive film is preferably 0.1 or more. An example of the high refractive film includes a film formed of ZnO, $TiO_2$, $CeO_2$, $Sb_2O_5$, $SnO_2$, $ZrO_2$, $Ta_2O_5$, of the like, and an example of the low refractive film includes a film formed of $SiO_2$ or the like.

An anti-fogging layer, an anti-fouling layer, and a water-repellent layer may be formed on the anti-reflection layer, if necessary. In a method of forming an anti-fogging layer, an anti-fouling layer, or a water-repellent layer, a treatment method, a treatment material, and the like are not particularly limited as long as it does not adversely affect the anti-reflection function, and a known anti-fogging treatment method, anti-fouling treatment method, water-repellent treatment method, and material can be used. Examples of the anti-fogging treatment method and the anti-fouling treatment method include a method of covering a surface with a surfactant, a method of applying a hydrophilic film to a surface to obtain water absorption, a method of covering a surface with fine irregularities to improve water absorption, a method of using photocatalytic activity to obtain water absorption, and a method of performing a super water repellent treatment to prevent adhesion of water droplets. Examples of the water repellent treatment method include a method of forming a water repellent treatment layer by depositing or sputtering a fluorine-containing silane compound or the like, and a method of forming a water repellent treatment layer by dissolving a fluorine-containing silane compound in a solvent and performing coating.

Although the disclosure has been described with reference to one embodiment, various configurations can be adopted as long as the effects of the disclosure are not impaired.

EXAMPLES

Hereinafter, the disclosure is described in more detail with reference to Examples, but the disclosure is not limited thereto. Evaluation methods and materials used in Examples of the disclosure are as follows.

[Method of Measuring L*, a*, and b*]

L*, a*, and b* in the CIE 1976 (L*, a*, b*) color system were measured in a 2 mm-thick plano lens using a spectral colorimeter (CM-5, manufactured by Konica Minolta, Inc.).

[Method of Measuring YI]

A yellow index (YI) of a 2 mm-thick plano lens was measured with a spectral colorimeter CM-5 manufactured by Konica Minolta, Inc.

[Method of Measuring Luminous Transmittance and Spectral Transmittance at Wavelength of 480 nm]

A spectral transmittance of a 2 mm-thick plano lens in a thickness direction was measured using a spectrophotometer UV-1800 manufactured by Shimadzu Corporation, and a luminous transmittance was determined.

[6-Item Headache Impact Test: HIT-6]

A group of all 19 subjects with migraine symptoms was divided into a first group of 9 subjects and a second group of 10 subjects, and a wearing test was performed on each group. Specifically, the 9 subjects in the first group lived one month without glasses (stage 1), then lived one month while wearing the glasses including the lenses obtained in Example (stage 2), further lived one month without the glasses (stage 3), and then lived one month while wearing the glasses including placebo lenses (a lens having a color tone equivalent to that of the lens obtained in Example, in which light of a wavelength of from 450 nm to 500 nm was not cut as compared with the lens obtained in Example) (stage 4). Here, during a period of performing the wearing test by the subjects, each of the subjects wore the glasses to be worn at each stage for 3 hours or longer a day without limiting the wearing scene and use according to the daily life of the subject. In addition, in order to reduce exogenous factors and stress caused by the subjects wearing the spectacle glasses, a lightweight and rimless frame was used in any spectacle frame (not illustrated).

Each subject recorded the presence or absence and symptoms of migraine every day in all stages, answered the following questionnaire of six items after the completion of the stage 1, the stage 2, and the stage 4, and calculated the total point obtained by summing the scores of the respective items. When the total point was 49 or less, the symptom of migraine was regarded as being within a negligible range, and thus it was determined that there was an effect of reducing migraine.

The 10 subjects in the second group lived one month without glasses (stage a), lived one month while wearing glasses including placebo lenses (stage b), further lived one month without glasses (stage c), and then lived one month while wearing the glasses including the lenses obtained in Example (stage d). After the completion of the stage a, the stage b, and the stage d, the following questionnaires of six items were answered, and the points of the respective items were summed up to calculate a total point. The answer results of the respective items were quantified according to the following criteria, and when the total point was 49 or less, the symptom of migraine was regarded as being within a negligible range, and thus it was determined that there was an effect of reducing migraine.

(Questionnaire)

Item 1 When you have a headache, how often have you had severe pain?

6 points: none at all, 8 points: almost none, 10 points: sometimes, 11 points: often, 13 points: always Item 2 Do you have trouble in daily life due to a headache? (for example, housework, work, school life, human relations, or the like)

6 points: none at all, 8 points: almost none, 10 points: sometimes, 11 points: often, 13 points: always Item 3 When you have a headache, do you sometimes want to lie down?

6 points: none at all, 8 points: almost none, 10 points: sometimes, 11 points: often, 13 points: always Item 4 Have you ever been unable to work or do your usual activities because you were tired from a headache in the last four weeks?

6 points: none at all, 8 points: almost none, 10 points: sometimes, 11 points: often, 13 points: always Item 5 Have you ever been tired or annoyed due to a headache in the last four weeks?

6 points: none at all, 8 points: almost none, 10 points: sometimes, 11 points: often, 13 points: always Item 6 Have you ever been unable to concentrate at work or in your daily activities due to a headache in the last four weeks?

6 points: none at all, 8 points: almost none, 10 points: sometimes, 11 points: often, 13 points: always Synthesis Example 1

30.0 g of a compound represented by the following Structural Formula (3-a) was dispersed in 150 g of 1,1,2-trichloroethane and 60 g of water, and a solution of 58.7 g of bromine and 60 g of 1,1,2-trichloroethane was added dropwise thereto at from 50° C. to 55° C. Stirring was performed at from 50° C. to 55° C. for 3 hours, and then cooling was performed to room temperature. An aqueous sodium sulfite solution (4.2 g of sodium sulfite and 21 g of water) was added to the reaction solution, and stirring was performed at room temperature for 15 minutes. Next, an aqueous sodium hydroxide solution (16.2 g of sodium hydroxide and 162 g of water) was added, and stirring was performed at room temperature for 30 minutes. The precipitate was collected by filtration, washed with water, washed with methanol, and dried, thereby obtaining 45.6 g of a compound represented by the following Structural Formula (3-b).

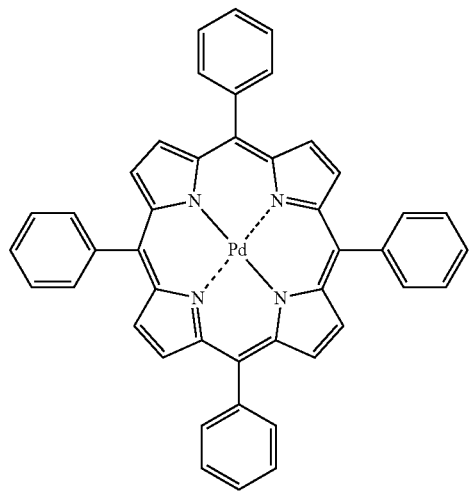

(3-a)

-continued (3-b)

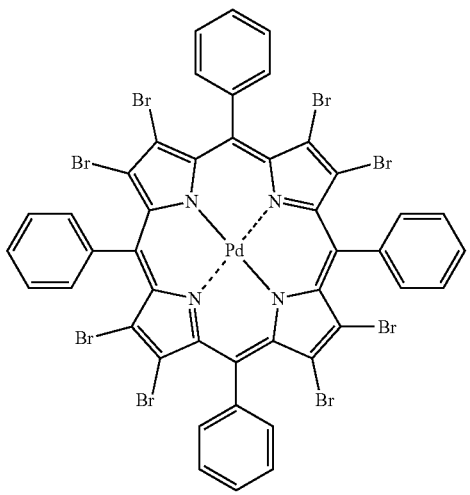

Next, 40.0 g of the compound represented by Structural Formula (3-b), 1.85 g of copper iodide, 3.16 g of bis(triphenylphosphine)palladium (II) dichloride, and 1.55 g of triphenylphosphine were dissolved in 800 ml of tetrahydrofuran, and 54.91 g of triethylamine and 29.2 g of 3,3-dimethyl-1-butyne (purity of 96%) were added thereto. Stirring was performed at room temperature under a nitrogen stream, insoluble matters were filtered after completion of the reaction, and the filtrate was concentrated under reduced pressure. 500 ml of methanol was added to the concentrated residue, stirring and filtration were performed, washing was performed with methanol, and drying was performed, thereby obtaining a crude matter. The crude matter was purified by a silica gel column (developing solvent: toluene/hexane=1:1 volume ratio), thereby obtaining 28.6 g of a specific compound (1-1).

(1-1)

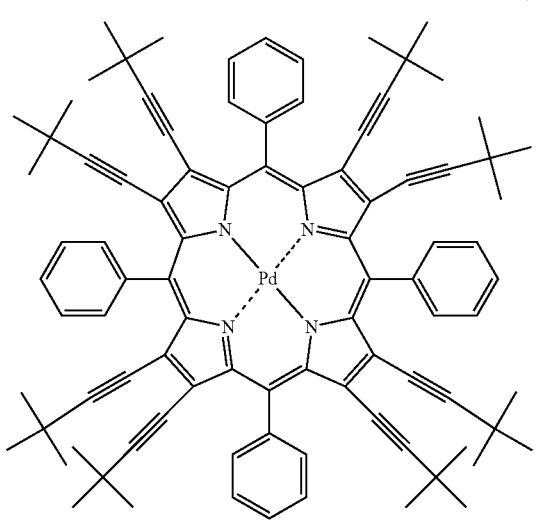

MS (m/e): 1,360 (M$^+$)

An absorption spectrum of the compound was measured using a Shimadzu spectrophotometer UV-1800 manufactured by Shimadzu Corporation at an optical path length of 10 mm of a chloroform solution having a concentration of 0.01 g/L, and as a result, there was an absorption peak at 479 nm. A half-value width of the peak was 36 nm.

Synthesis Example 2

15.0 g of a compound represented by the following Structural Formula (2-a) was dissolved in 150 ml of N,N-dimethylformamide, and 31.8 g of bromine was added dropwise at from 10° C. to 20° C. Stirring was performed at room temperature for 4 hours, the mixture was discharged to 700 g of ice water, and the mixture was neutralized with an aqueous sodium hydroxide solution. The precipitate was collected by filtration, washed with water, washed with methanol, and dried, thereby obtaining 31 g of a compound represented by the following Structural Formula (2-b).

(2-a)

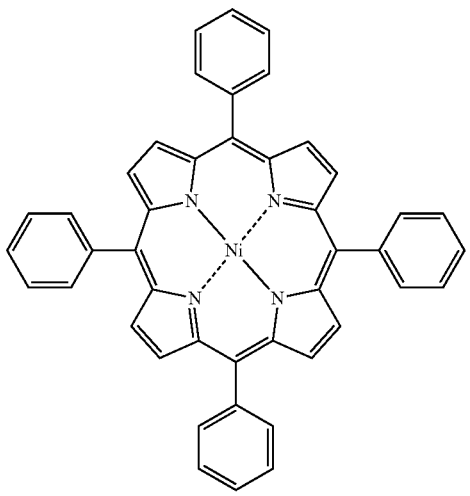

(2-b)

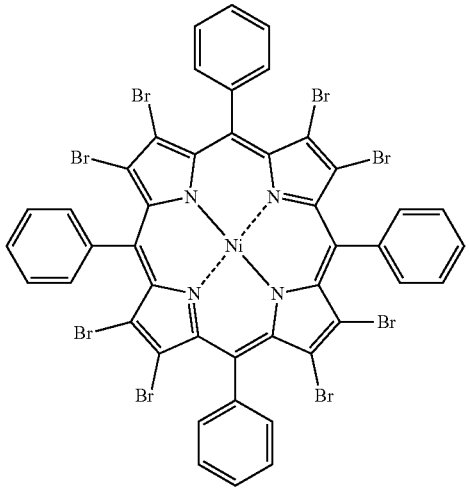

Next, 26.1 g of the compound represented by Structural Formula (2-b), 1.34 g of copper iodide, 2.13 g of bis(triphenylphosphine)palladium (II) dichloride, and 1.05 g of triphenylphosphine were dissolved in 525 ml of tetrahydrofuran, and 36.4 g of triethylamine and 21.16 g of 3,3-dimethyl-1-butyne (purity of 96%) were added thereto. Stirring was performed at room temperature under a nitrogen stream, insoluble matters were filtered after completion of the reaction, and the filtrate was concentrated under reduced pressure. 500 ml of 85% methanol water was added to the concentrated residue, stirring and filtration were performed, washing was performed with 85% methanol water, and drying was performed, thereby obtaining a crude matter. The crude matter was purified by a silica gel column (developing solvent: toluene/hexane=6:4 volume ratio), thereby obtaining 10.8 g of a specific compound (1-2).

(1-2)

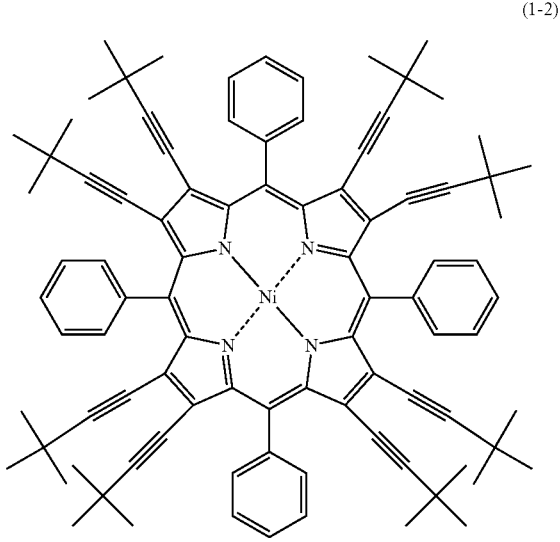

MS (m/e): 1,312 (M⁺)

An absorption spectrum of the compound was measured using a Shimadzu spectrophotometer UV-1800 manufactured by Shimadzu Corporation at an optical path length of 10 mm of a chloroform solution having a concentration of 0.01 g/L, and as a result, there was an absorption peak at 479 nm. A half-value width of the peak was 27 nm.

Example 1

A mixed solution was prepared by charging 0.35 parts by mass of dibutyltin (II) dichloride, 1 part by mass of Zelec UN manufactured by Stefan Company, 15 parts by mass of an ultraviolet absorber Tinuvin 329 manufactured by BASF Japan Ltd., 506 parts by mass of a mixture of 2,5-bis (isocyanatomethyl)bicyclo-[2.2.1]-heptane and 2,6-bis(isocyanatomethyl)bicyclo-[2.2.1]-heptane, 20 ppm of the compound (1-1) obtained in Synthesis Example 1, 8 ppm of Plast Blue 8514 (manufactured by ARIMOTO CHEMICAL CO., LTD.), and 5 ppm of Plast Red 8320 (manufactured by ARIMOTO CHEMICAL CO., LTD.). The mixed solution was stirred at 25° C. for 1 hour to be completely dissolved. Thereafter, 255 parts by mass of 4-mercaptomethyl-1,8-dimercapto-3,6-dithiaoctane and 239 parts by mass of pentaerythritol tetrakis(3-mercaptopropionate) were added to the prepared solution, and stirring was performed at 25° C. for 30 minutes, thereby obtaining a uniform solution. The solution was defoamed at 400 Pa for 1 hour, filtering was performed by a 1 μm PTFE filter, and then the filtered solution was injected into a 2 C plano glass mold having a center thickness of 2 mm and a diameter of 80 mm. The glass mold was heated from 25° C. to 120° C. over 16 hours. The glass mold was cooled to room temperature, the glass mold was removed, and a plano lens was obtained. The obtained plano lens was further annealed at 120° C. for 2 hours. Urethane-based primer coating and silicone-based hard coating were sequentially performed by dip coating to form a film on the surface of the plano lens, $SiO_2$ and $ZrO_2$ were alternately laminated by a vacuum vapor deposition method to form an anti-reflection film having a five-layer structure, and then, a fluorine-based water-repellent film was formed on the outermost surface. Physical properties of the obtained plano lens were measured. The results are shown in Table-1. The transmittance data are shown in Table-3, and the transmittance curve is illustrated in FIG. 1.

The plano lens according to the present example was prepared, and glasses including the two plano lenses were prepared. Thereafter, the test sample was subjected to the wearing test by the subjects described above, and evaluation was performed by the Headache Impact Test (HIT-6) in order to verify an effect of reducing migraine. The evaluation results are shown in Table-2.

Example 2

Figure 2:
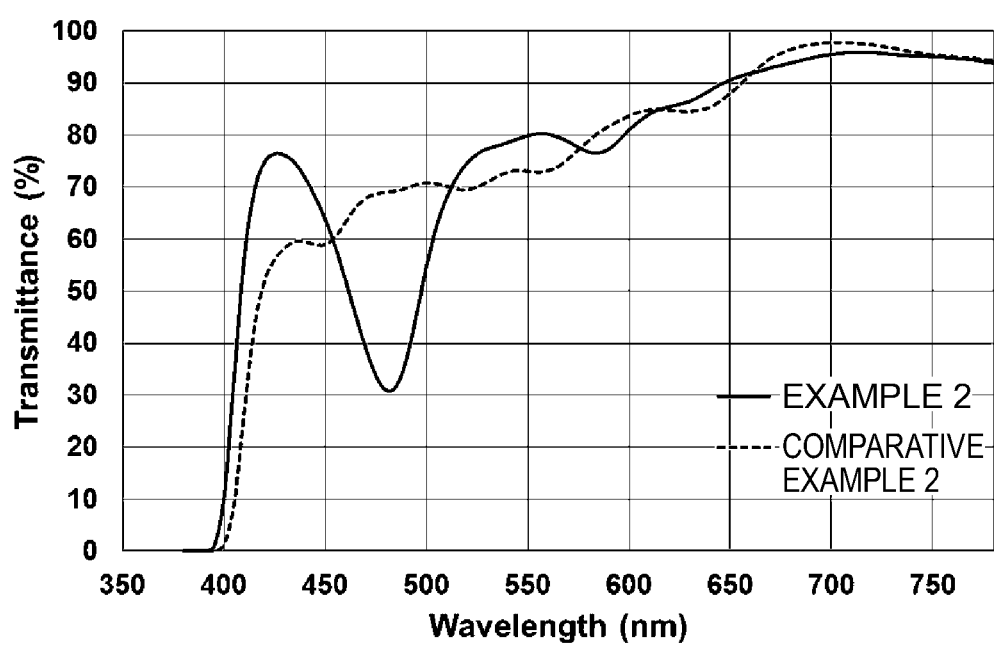
FIG. 2 illustrates a transmittance curve of a plano lens obtained in Example 2.

A mixed solution was prepared by charging 0.35 parts by mass of dibutyltin (II) dichloride, 1 part by mass of Zelec UN manufactured by Stefan Company, 15 parts by mass of an ultraviolet absorber Tinuvin 329 manufactured by BASF Japan Ltd., 506 parts by mass of a mixture of 2,5-bis (isocyanatomethyl)bicyclo-[2.2.1]-heptane and 2,6-bis(isocyanatomethyl)bicyclo-[2.2.1]-heptane, 15 ppm of the compound (1-1) obtained in Synthesis Example 1, 5 ppm of Plast Blue 8514 (manufactured by ARIMOTO CHEMICAL CO., LTD.), and 5 ppm of Plast Red 8320 (manufactured by ARIMOTO CHEMICAL CO., LTD.). The mixed solution was stirred at 25° C. for 1 hour to be completely dissolved. Thereafter, 255 parts by mass of 4-mercaptomethyl-1,8-dimercapto-3,6-dithiaoctane and 239 parts by mass of pentaerythritol tetrakis(3-mercaptopropionate) were added to the prepared solution, and stirring was performed at 25° C. for 30 minutes, thereby obtaining a uniform solution. The solution was defoamed at 400 Pa for 1 hour, filtering was performed by a 1 μm PTFE filter, and then the filtered solution was injected into a 2 C plano glass mold having a center thickness of 2 mm and a diameter of 80 mm. The glass mold was heated from 25° C. to 120° C. over 16 hours. The glass mold was cooled to room temperature, the glass mold was removed, and a plano lens was obtained. The obtained plano lens was further annealed at 120° C. for 2 hours. Urethane-based primer coating and silicone-based hard coating were sequentially performed by dip coating to form a film on the surface of the plano lens, $SiO_2$ and $ZrO_2$ were alternately laminated by a vacuum vapor deposition method to form an anti-reflection film having a five-layer structure, and then, a fluorine-based water-repellent film was formed on the outermost surface. Physical properties of the obtained plano lens were measured. The results are shown in Table-1. The transmittance data are shown in Table-3, and the transmittance curve is illustrated in FIG. 2.

The plano lens according to the present example was prepared, and glasses including the two plano lenses were prepared. Thereafter, the test sample was subjected to the wearing test by the subjects described above, and evaluation was performed by the Headache Impact Test (HIT-6) in order to verify an effect of reducing migraine. The evaluation results are shown in Table-2.

Comparative Example 1

A mixed solution was prepared by charging 0.35 parts by mass of dibutyltin (II) dichloride, 1 part by mass of Zelec UN manufactured by Stefan Company, 15 parts by mass of an ultraviolet absorber Tinuvin 329 manufactured by BASF Japan Ltd., and 506 parts by mass of a mixture of 2,5-bis (isocyanatomethyl)bicyclo-[2.2.1]-heptane and 2,6-bis(isocyanatomethyl)bicyclo-[2.2.1]-heptane. The mixed solution was stirred at 25° C. for 1 hour to be completely dissolved. Thereafter, 255 parts by mass of 4-mercaptomethyl-1,8-dimercapto-3,6-dithiaoctane and 239 parts by mass of pentaerythritol tetrakis(3-mercaptopropionate) were added to the prepared solution, and stirring was performed at 25° C. for 30 minutes, thereby obtaining a uniform solution. The solution was defoamed at 400 Pa for 1 hour, filtering was performed by a 1 μm PTFE filter, and then the filtered solution was injected into a 2 C plano glass mold having a center thickness of 2 mm and a diameter of 80 mm. The glass mold was heated from 25° C. to 120° C. over 16 hours. The glass mold was cooled to room temperature, the glass mold was removed, and a plano lens was obtained. The obtained plano lens was further annealed at 120° C. for 2 hours.

1 part by mass of Dianix Blue FBL (manufactured by Dystar Japan Ltd.) as a blue dye was added to 1 liter of water heated to 90° C., and 40 parts by mass of benzyl alcohol as a carrier material and 1 part by mass of a surfactant were mixed, thereby preparing a blue dye dispersion liquid. Similarly, a red dye dispersion liquid was prepared by Sumikaron Red E-RPD (manufactured by Sumika Chemtex Co., Ltd.), a yellow dye dispersion liquid was prepared by Dianix Yellow AC-E (manufactured by Dystar Japan Ltd.), and a brown dye dispersion liquid was prepared by Dianix Yellow Brown AM-R (manufactured by Dystar Japan Ltd.). The plano lens was immersed in each of the obtained dye dispersion liquids of the respective colors, and the plano lens was dyed until the lens had the same luminous transmittance and the same color tone as those of the lens produced in Example 1.

Urethane-based primer coating and silicone-based hard coating were sequentially performed by dip coating to form a film on the surface of the dyed plano lens, $SiO_2$ and $ZrO_2$ were alternately laminated by a vacuum vapor deposition method to form an anti-reflection film having a five-layer structure, and then, a fluorine-based water-repellent film was formed on the outermost surface.

Physical properties of the obtained plano lens were measured. The results are shown in Table-1. The transmittance data are shown in Table-3, and the transmittance curve is illustrated in FIG. 1.

Another plano lens dyed based on the present comparative example was prepared, and glasses including the two plano lenses were prepared. Thereafter, the test sample was subjected to the wearing test by the subjects described above, and evaluation was performed by the Headache Impact Test (HIT-6) in order to verify an effect of reducing migraine. The evaluation results are shown in Table-2.

Comparative Example 2

A plano lens was prepared in the same manner as that of Comparative Example 1.

1 part by mass of Dianix Blue FBL (manufactured by Dystar Japan Ltd.) as a blue dye was added to 1 liter of water heated to 90° C., and 40 parts by mass of benzyl alcohol as a carrier material and 1 part by mass of a surfactant were mixed, thereby preparing a blue dye dispersion liquid. Similarly, a red dye dispersion liquid was prepared by Sumikaron Red E-RPD (manufactured by Sumika Chemtex Co., Ltd.), a yellow dye dispersion liquid was prepared by Dianix Yellow AC-E (manufactured by Dystar Japan Ltd.), and a brown dye dispersion liquid was prepared by Dianix Yellow Brown AM-R (manufactured by Dystar Japan Ltd.). The plano lens was immersed in each of the obtained dye dispersion liquids of the respective colors, and the plano lens was dyed until the lens had the same luminous transmittance and the same color tone as those of the lens prepared in Example 2.

Urethane-based primer coating and silicone-based hard coating were sequentially performed by dip coating to form a film on the surface of the dyed plano lens, $SiO_2$ and $ZrO_2$ were alternately laminated by a vacuum vapor deposition method to form an anti-reflection film having a five-layer structure, and then, a fluorine-based water-repellent film was formed on the outermost surface.

Physical properties of the obtained plano lens were measured. The results are shown in Table-1. The transmittance data are shown in Table-3, and the transmittance curve is illustrated in FIG. 2.

Another plano lens dyed based on the present comparative example was prepared, and glasses including the two plano lenses were prepared. Thereafter, the test sample was subjected to the wearing test by the subjects described above, and evaluation was performed by the Headache Impact Test (HIT-6) in order to verify an effect of reducing migraine. The evaluation results are shown in Table-2.

TABLE 1

|  | Porphyrin (ppm) | Plast Blue 8514(ppm) | Plast Red 8320(ppm) | Transmittance 480 nm (%) | Luminous transmittance (%) | Hue | | | |
|---|---|---|---|---|---|---|---|---|---|
|  |  |  |  |  |  | YI | L* | a* | b* |
| Comparative Example 1 | — | — | — | 62.6 | 70.1 | 28.8 | 87.6 | 2.7 | 13.7 |
| Comparative Example 2 | — | — | — | 69.0 | 75.4 | 25.3 | 89.7 | 2.9 | 12.0 |
| Example 1 | 20 | 8 | 5 | 21.7 | 70.0 | 38.8 | 86.7 | 3.3 | 19.5 |
| Example 2 | 15 | 5 | 5 | 30.9 | 75.8 | 33.2 | 89.6 | 3.4 | 16.6 |

TABLE 2

| Subject No. | Age | Total point (1) without glasses | Glasses of Comparative Example Total point (2) | (2)-(1) | Comparative Example No. | Glasses of Example Total point (3) | (3)-(1) | Example No. |
|---|---|---|---|---|---|---|---|---|
| 1 | 35 | 54 | 52 | −2 | 1 | 48 | −6 | 1 |
| 2 | 39 | 61 | 60 | −1 | 2 | 61 | 0 | 2 |
| 3 | 43 | 66 | 62 | −4 | 1 | 66 | 0 | 1 |
| 4 | 42 | 54 | 50 | −4 | 2 | 48 | −6 | 2 |
| 5 | 33 | 60 | 61 | 1 | 1 | 64 | 4 | 1 |
| 6 | 37 | 63 | 56 | −7 | 2 | 50 | −13 | 2 |
| 7 | 25 | 50 | 60 | 10 | 1 | 54 | 4 | 1 |
| 8 | 37 | 54 | 55 | 1 | 2 | 61 | 7 | 2 |
| 9 | 26 | 54 | 54 | 0 | 1 | 48 | −6 | 1 |
| 10 | 33 | 59 | 61 | 2 | 1 | 60 | 1 | 1 |
| 11 | 38 | 59 | 52 | −7 | 2 | 61 | 2 | 2 |
| 12 | 21 | 64 | 61 | −3 | 1 | 55 | −9 | 1 |
| 13 | 47 | 62 | 66 | 4 | 2 | 65 | 3 | 2 |
| 14 | 48 | 60 | 60 | 0 | 1 | 60 | 0 | 1 |
| 15 | 28 | 54 | 57 | 3 | 2 | 44 | −10 | 2 |
| 16 | 33 | 61 | 56 | −5 | 1 | 60 | −1 | 1 |
| 17 | 38 | 60 | 54 | −6 | 2 | 46 | −14 | 2 |
| 18 | 37 | 58 | 60 | 2 | 1 | 60 | 2 | 1 |
| 19 | 40 | 60 | 60 | 0 | 2 | 48 | −12 | 2 |

As shown in Table-2, the total point (3) in the Headache Impact Test (HIT-6) results obtained from 6 people who were 32% of all the 19 subjects wearing the glasses of Example was 49 or less, which was a standard score for determining that the headache had little or no influence on daily life, and the effect of reducing migraine was thus observed.

In addition, the total point (3) in the Headache Impact Test (HIT-6) results obtained from 2 people (subjects Nos. 6 and 12) who were 11% of all the 19 subjects wearing the glasses of Example was significantly improved as compared with the total point (1) in the case of not wearing the glasses. Specifically, the headache was reduced from the state in which the headache considerably affected daily life (standard score of 60 or more) to the state in which the headache affected daily life to some extent (standard score of from 50 to 55), and a certain effect of reducing migraine was thus observed.

From the above results, a certain level of more of the effect of reducing migraine was observed in 8 people which were 43% of all the 19 subjects wearing the glasses of Example.

In Table-2, in the subjects Nos. 1 to 19, in the case where the glasses of Example were used, the total value of the values of (3)-(1) was −54, and the average value was −2.84.

That is, in the case where the glasses of Example were used, the score was lowered by 2.84 on average as compared with the case of not using the glasses.

On the other hand, in the subjects Nos. 1 to 19, in the case where the glasses of Comparative Example were used, the total value of the values of (2)-(1) was −16, and the average value was −0.84.

That is, in the case where the glasses of Comparative Example were used, the score was lowered by 0.84 on average as compared with the case of not using the glasses.

From the above results, it was shown that in the case of the glasses of Example, migraine caused by photosensitivity was reduced as compared with the glasses of Comparative Example.

TABLE 3

| Wavelength (nm) | Lens of Comparative Example 1 Transmittance (%) | Lens of Comparative Example 2 Transmittance (%) | Lens of Example 1 Transmittance (%) | Lens of Example 2 Transmittance (%) |
|---|---|---|---|---|
| 350 | 0.01 | 0.03 | 0.2 | 0.19 |
| 351 | 0.02 | 0.03 | 0.19 | 0.2 |
| 352 | 0.02 | 0.03 | 0.19 | 0.21 |
| 353 | 0.02 | 0.02 | 0.19 | 0.21 |
| 354 | 0.02 | 0.02 | 0.19 | 0.21 |
| 355 | 0.02 | 0.02 | 0.19 | 0.2 |
| 356 | 0.02 | 0.03 | 0.18 | 0.19 |
| 357 | 0.02 | 0.03 | 0.17 | 0.18 |
| 358 | 0.02 | 0.02 | 0.16 | 0.17 |
| 359 | 0.03 | 0.02 | 0.15 | 0.16 |
| 360 | 0.03 | 0.02 | 0.14 | 0.15 |
| 361 | 0.03 | 0.02 | 0.12 | 0.14 |
| 362 | 0.03 | 0.01 | 0.1 | 0.12 |
| 363 | 0.03 | 0.02 | 0.09 | 0.1 |
| 364 | 0.03 | 0.02 | 0.08 | 0.08 |
| 365 | 0.03 | 0.02 | 0.07 | 0.06 |
| 366 | 0.02 | 0.02 | 0.06 | 0.05 |
| 367 | 0.02 | 0.02 | 0.06 | 0.05 |
| 368 | 0.02 | 0.02 | 0.05 | 0.05 |
| 369 | 0.02 | 0.02 | 0.05 | 0.05 |
| 370 | 0.02 | 0.03 | 0.05 | 0.05 |
| 371 | 0.02 | 0.03 | 0.05 | 0.05 |
| 372 | 0.03 | 0.03 | 0.05 | 0.05 |
| 373 | 0.03 | 0.03 | 0.04 | 0.04 |
| 374 | 0.04 | 0.04 | 0.04 | 0.05 |
| 375 | 0.04 | 0.04 | 0.04 | 0.05 |
| 376 | 0.04 | 0.04 | 0.05 | 0.05 |
| 377 | 0.04 | 0.04 | 0.05 | 0.05 |
| 378 | 0.04 | 0.05 | 0.05 | 0.06 |
| 379 | 0.04 | 0.05 | 0.06 | 0.06 |
| 380 | 0.04 | 0.05 | 0.06 | 0.07 |
| 381 | 0.05 | 0.05 | 0.07 | 0.07 |
| 382 | 0.05 | 0.06 | 0.07 | 0.08 |
| 383 | 0.05 | 0.06 | 0.08 | 0.08 |
| 384 | 0.05 | 0.06 | 0.08 | 0.09 |
| 385 | 0.05 | 0.07 | 0.09 | 0.1 |
| 386 | 0.06 | 0.07 | 0.1 | 0.11 |
| 387 | 0.06 | 0.08 | 0.11 | 0.11 |
| 388 | 0.07 | 0.08 | 0.12 | 0.12 |
| 389 | 0.07 | 0.08 | 0.12 | 0.13 |
| 390 | 0.08 | 0.09 | 0.12 | 0.14 |
| 391 | 0.08 | 0.09 | 0.12 | 0.14 |
| 392 | 0.09 | 0.1 | 0.2 | 0.19 |

TABLE 3-continued

| Wavelength (nm) | Lens of Comparative Example 1 Transmittance (%) | Lens of Comparative Example 2 Transmittance (%) | Lens of Example 1 Transmittance (%) | Lens of Example 2 Transmittance (%) |
|---|---|---|---|---|
| 393 | 0.1 | 0.11 | 0.33 | 0.32 |
| 394 | 0.1 | 0.11 | 0.49 | 0.55 |
| 395 | 0.11 | 0.12 | 0.85 | 0.9 |
| 396 | 0.15 | 0.16 | 1.61 | 1.58 |
| 397 | 0.23 | 0.25 | 2.81 | 2.84 |
| 398 | 0.35 | 0.39 | 4.5 | 4.65 |
| 399 | 0.61 | 0.68 | 6.85 | 7.09 |
| 400 | 1.1 | 1.24 | 9.96 | 10.21 |
| 401 | 1.82 | 2.04 | 13.65 | 14.09 |
| 402 | 2.76 | 3.11 | 17.76 | 18.44 |
| 403 | 4.08 | 4.62 | 22.27 | 23.21 |
| 404 | 5.87 | 6.68 | 27.09 | 28.28 |
| 405 | 8.06 | 9.19 | 31.94 | 33.48 |
| 406 | 10.61 | 12.16 | 36.78 | 38.69 |
| 407 | 13.49 | 15.52 | 41.58 | 43.72 |
| 408 | 16.67 | 19.23 | 45.98 | 48.46 |
| 409 | 19.99 | 23.06 | 50.03 | 52.73 |
| 410 | 23.28 | 26.85 | 53.7 | 56.48 |
| 411 | 26.48 | 30.53 | 56.92 | 59.8 |
| 412 | 29.5 | 33.99 | 59.65 | 62.66 |
| 413 | 32.32 | 37.25 | 62.01 | 65.12 |
| 414 | 34.94 | 40.29 | 64.17 | 67.26 |
| 415 | 37.34 | 43.07 | 66.06 | 69.24 |
| 416 | 39.41 | 45.42 | 67.52 | 70.85 |
| 417 | 41.16 | 47.5 | 68.74 | 72.21 |
| 418 | 42.71 | 49.26 | 69.73 | 73.29 |
| 419 | 44.02 | 50.74 | 70.47 | 74.18 |
| 420 | 45.1 | 51.95 | 70.96 | 74.86 |
| 421 | 45.99 | 52.96 | 71.31 | 75.4 |
| 422 | 46.78 | 53.86 | 71.59 | 75.75 |
| 423 | 47.52 | 54.72 | 71.84 | 76.05 |
| 424 | 48.16 | 55.45 | 71.98 | 76.3 |
| 425 | 48.71 | 56.07 | 72.02 | 76.42 |
| 426 | 49.21 | 56.63 | 71.98 | 76.48 |
| 427 | 49.64 | 57.11 | 71.83 | 76.46 |
| 428 | 50 | 57.53 | 71.65 | 76.42 |
| 429 | 50.36 | 57.95 | 71.46 | 76.32 |
| 430 | 50.72 | 58.29 | 71.18 | 76.13 |
| 431 | 51.01 | 58.64 | 70.86 | 75.91 |
| 432 | 51.26 | 58.89 | 70.43 | 75.64 |
| 433 | 51.5 | 59.15 | 69.95 | 75.34 |
| 434 | 51.71 | 59.36 | 69.44 | 74.98 |
| 435 | 51.89 | 59.53 | 68.87 | 74.64 |
| 436 | 51.99 | 59.58 | 68.21 | 74.18 |
| 437 | 52.04 | 59.6 | 67.51 | 73.64 |
| 438 | 52.08 | 59.59 | 66.8 | 73.1 |
| 439 | 52.13 | 59.53 | 66.07 | 72.48 |
| 440 | 52.11 | 59.46 | 65.32 | 71.82 |
| 441 | 52.08 | 59.36 | 64.51 | 71.1 |
| 442 | 52 | 59.26 | 63.69 | 70.41 |
| 443 | 51.93 | 59.16 | 62.83 | 69.69 |
| 444 | 51.87 | 59.06 | 61.95 | 68.95 |
| 445 | 51.8 | 58.95 | 60.98 | 68.14 |
| 446 | 51.75 | 58.85 | 59.98 | 67.32 |
| 447 | 51.76 | 58.81 | 58.94 | 66.47 |
| 448 | 51.83 | 58.81 | 57.87 | 65.57 |
| 449 | 51.95 | 58.86 | 56.77 | 64.66 |
| 450 | 52.08 | 58.96 | 55.7 | 63.76 |
| 451 | 52.26 | 59.14 | 54.59 | 62.8 |
| 452 | 52.53 | 59.38 | 53.44 | 61.81 |
| 453 | 52.85 | 59.68 | 52.24 | 60.76 |
| 454 | 53.22 | 60.04 | 50.97 | 59.65 |
| 455 | 53.69 | 60.47 | 49.67 | 58.47 |
| 456 | 54.18 | 60.98 | 48.32 | 57.24 |
| 457 | 54.72 | 61.53 | 46.96 | 55.97 |
| 458 | 55.27 | 62.09 | 45.62 | 54.72 |
| 459 | 55.81 | 62.62 | 44.26 | 53.4 |
| 460 | 56.38 | 63.21 | 42.89 | 52.09 |
| 461 | 56.92 | 63.83 | 41.51 | 50.79 |
| 462 | 57.46 | 64.44 | 40.1 | 49.45 |
| 463 | 58 | 65.05 | 38.63 | 48.06 |
| 464 | 58.48 | 65.59 | 37.15 | 46.68 |
| 465 | 58.92 | 66.1 | 35.72 | 45.33 |
| 466 | 59.34 | 66.54 | 34.31 | 44.02 |
| 467 | 59.71 | 66.92 | 32.93 | 42.73 |
| 468 | 60.06 | 67.25 | 31.6 | 41.46 |
| 469 | 60.41 | 67.52 | 30.3 | 40.2 |
| 470 | 60.75 | 67.82 | 29.05 | 39 |
| 471 | 61.04 | 68.09 | 27.85 | 37.8 |
| 472 | 61.28 | 68.32 | 26.75 | 36.67 |
| 473 | 61.49 | 68.46 | 25.75 | 35.58 |
| 474 | 61.71 | 68.61 | 24.83 | 34.59 |
| 475 | 61.89 | 68.69 | 24.01 | 33.71 |
| 476 | 62.06 | 68.79 | 23.34 | 32.95 |
| 477 | 62.22 | 68.85 | 22.77 | 32.3 |
| 478 | 62.38 | 68.92 | 22.28 | 31.7 |
| 479 | 62.52 | 68.97 | 21.9 | 31.23 |
| 480 | 62.64 | 69.02 | 21.68 | 30.94 |
| 481 | 62.7 | 69.04 | 21.59 | 30.78 |
| 482 | 62.75 | 69.09 | 21.61 | 30.72 |
| 483 | 62.8 | 69.13 | 21.76 | 30.83 |
| 484 | 62.88 | 69.21 | 22.12 | 31.16 |
| 485 | 62.97 | 69.28 | 22.61 | 31.67 |
| 486 | 63.04 | 69.38 | 23.24 | 32.32 |
| 487 | 63.12 | 69.47 | 24.04 | 33.16 |
| 488 | 63.22 | 69.58 | 25.03 | 34.23 |
| 489 | 63.29 | 69.65 | 26.17 | 35.44 |
| 490 | 63.39 | 69.77 | 27.42 | 36.78 |
| 491 | 63.46 | 69.86 | 28.82 | 38.23 |
| 492 | 63.57 | 70.01 | 30.41 | 39.86 |
| 493 | 63.69 | 70.16 | 32.16 | 41.6 |
| 494 | 63.83 | 70.34 | 34 | 43.45 |
| 495 | 63.98 | 70.48 | 35.98 | 45.37 |
| 496 | 64.12 | 70.62 | 38.04 | 47.33 |
| 497 | 64.22 | 70.71 | 40.1 | 49.27 |
| 498 | 64.33 | 70.79 | 42.16 | 51.17 |
| 499 | 64.45 | 70.82 | 44.22 | 53.01 |
| 500 | 64.52 | 70.85 | 46.26 | 54.78 |
| 501 | 64.61 | 70.85 | 48.25 | 56.47 |
| 502 | 64.7 | 70.83 | 50.22 | 58.13 |
| 503 | 64.78 | 70.79 | 52.13 | 59.72 |
| 504 | 64.87 | 70.74 | 53.93 | 61.2 |
| 505 | 64.91 | 70.65 | 55.6 | 62.57 |
| 506 | 64.95 | 70.57 | 57.17 | 63.83 |
| 507 | 64.96 | 70.48 | 58.62 | 64.98 |
| 508 | 64.95 | 70.38 | 59.93 | 66.06 |
| 509 | 64.94 | 70.26 | 61.15 | 67.05 |
| 510 | 64.91 | 70.15 | 62.33 | 68.01 |
| 511 | 64.83 | 70.02 | 63.38 | 68.91 |
| 512 | 64.77 | 69.89 | 64.34 | 69.74 |
| 513 | 64.73 | 69.79 | 65.22 | 70.55 |
| 514 | 64.66 | 69.69 | 66.01 | 71.29 |
| 515 | 64.6 | 69.61 | 66.72 | 71.95 |
| 516 | 64.55 | 69.58 | 67.37 | 72.58 |
| 517 | 64.5 | 69.57 | 67.97 | 73.15 |
| 518 | 64.45 | 69.52 | 68.54 | 73.67 |
| 519 | 64.4 | 69.5 | 69.05 | 74.18 |
| 520 | 64.36 | 69.51 | 69.54 | 74.62 |
| 521 | 64.34 | 69.54 | 69.98 | 75.03 |
| 522 | 64.36 | 69.61 | 70.41 | 75.42 |
| 523 | 64.4 | 69.69 | 70.79 | 75.77 |
| 524 | 64.49 | 69.85 | 71.17 | 76.12 |
| 525 | 64.59 | 70 | 71.48 | 76.39 |
| 526 | 64.71 | 70.2 | 71.82 | 76.67 |
| 527 | 64.88 | 70.45 | 72.16 | 76.92 |
| 528 | 65.03 | 70.65 | 72.44 | 77.11 |
| 529 | 65.18 | 70.83 | 72.64 | 77.25 |
| 530 | 65.37 | 71.02 | 72.86 | 77.39 |
| 531 | 65.58 | 71.25 | 73.07 | 77.53 |
| 532 | 65.78 | 71.44 | 73.22 | 77.61 |
| 533 | 65.99 | 71.65 | 73.35 | 77.73 |
| 534 | 66.21 | 71.84 | 73.48 | 77.83 |
| 535 | 66.42 | 72.04 | 73.61 | 77.96 |
| 536 | 66.65 | 72.27 | 73.78 | 78.11 |
| 537 | 66.85 | 72.46 | 73.89 | 78.21 |
| 538 | 67.04 | 72.63 | 73.99 | 78.31 |
| 539 | 67.24 | 72.76 | 74.08 | 78.42 |
| 540 | 67.43 | 72.89 | 74.18 | 78.54 |

TABLE 3-continued

| Wave-length (nm) | Lens of Comparative Example 1 Transmittance (%) | Lens of Comparative Example 2 Transmittance (%) | Lens of Example 1 Transmittance (%) | Lens of Example 2 Transmittance (%) |
|---|---|---|---|---|
| 541 | 67.6 | 73.02 | 74.26 | 78.67 |
| 542 | 67.73 | 73.11 | 74.3 | 78.8 |
| 543 | 67.84 | 73.15 | 74.34 | 78.94 |
| 544 | 67.94 | 73.17 | 74.4 | 79.09 |
| 545 | 68.02 | 73.17 | 74.48 | 79.25 |
| 546 | 68.08 | 73.17 | 74.55 | 79.4 |
| 547 | 68.12 | 73.15 | 74.62 | 79.53 |
| 548 | 68.14 | 73.12 | 74.69 | 79.63 |
| 549 | 68.15 | 73 08 | 74.78 | 79.75 |
| 550 | 68.16 | 73.04 | 74.88 | 79.9 |
| 551 | 68.16 | 73.03 | 74.97 | 80.02 |
| 552 | 68.13 | 72.99 | 75.03 | 80.11 |
| 553 | 68.11 | 72.95 | 75.1 | 80.21 |
| 554 | 68.09 | 72.91 | 75.15 | 80.25 |
| 555 | 68.06 | 72 88 | 75 19 | 80.28 |
| 556 | 68.04 | 72.89 | 75.21 | 80.28 |
| 557 | 68.01 | 72.92 | 75.21 | 80.26 |
| 558 | 68.01 | 72.98 | 75.19 | 80.23 |
| 559 | 68.04 | 73.05 | 75.14 | 80.2 |
| 560 | 68.12 | 73.16 | 75.09 | 80.18 |
| 561 | 68.18 | 73 26 | 75 | 80.12 |
| 562 | 68.28 | 73.39 | 74.89 | 80.04 |
| 563 | 68.4 | 73.55 | 74.75 | 79.92 |
| 564 | 68.54 | 73.74 | 74.58 | 79.78 |
| 565 | 68.71 | 73.96 | 74.39 | 79.6 |
| 566 | 68.9 | 74.21 | 74.16 | 79.42 |
| 567 | 69.13 | 74.48 | 73.89 | 79.24 |
| 568 | 69.39 | 74.79 | 73.61 | 79.05 |
| 569 | 69.68 | 75.08 | 73.31 | 78.87 |
| 570 | 70.01 | 75.44 | 73.04 | 78.73 |
| 571 | 70.34 | 75.79 | 72.76 | 78.56 |
| 572 | 70.68 | 76.15 | 72.46 | 78.36 |
| 573 | 71.03 | 76.52 | 72.15 | 78.15 |
| 574 | 71.37 | 76.86 | 71.82 | 77.92 |
| 575 | 71.71 | 77.23 | 71.47 | 77.69 |
| 576 | 72.06 | 77.58 | 71.1 | 77.48 |
| 577 | 72.4 | 77.92 | 70.75 | 77.28 |
| 578 | 72.75 | 78.27 | 70.44 | 77.09 |
| 579 | 73.09 | 78.57 | 70.15 | 76.91 |
| 580 | 73.43 | 78.9 | 69.91 | 76.76 |
| 581 | 73.79 | 79.21 | 69.72 | 76.63 |
| 582 | 74.16 | 79.55 | 69.58 | 76.54 |
| 583 | 74.5 | 79.87 | 69.47 | 76.49 |
| 584 | 74.85 | 80.21 | 69.43 | 76.52 |
| 585 | 75.16 | 80.53 | 69.44 | 76.58 |
| 586 | 75.43 | 80 81 | 69.47 | 76.64 |
| 587 | 75.72 | 81.08 | 69.56 | 76.76 |
| 588 | 75.97 | 81.29 | 69.7 | 76.9 |
| 589 | 76.24 | 81 49 | 69.91 | 77.08 |
| 590 | 76.52 | 81.7 | 70.18 | 77.31 |
| 591 | 76.82 | 81.92 | 70.54 | 77.59 |
| 592 | 77.08 | 82.14 | 70.95 | 77.92 |
| 593 | 77.32 | 82.35 | 71.34 | 78.27 |
| 594 | 77.55 | 82.58 | 71.77 | 78.66 |
| 595 | 77.73 | 82.75 | 72.21 | 79 |
| 596 | 77.93 | 82.95 | 72.67 | 79.39 |
| 597 | 78.13 | 83.15 | 73.14 | 79.81 |
| 598 | 78.35 | 83.36 | 73.63 | 80.21 |
| 599 | 78.56 | 83.55 | 74.13 | 80.62 |
| 600 | 78.77 | 83.72 | 74.63 | 81 |
| 601 | 78.99 | 83.9 | 75 09 | 81.38 |
| 602 | 79.15 | 84.05 | 75.52 | 81.73 |
| 603 | 79.3 | 84.21 | 75.93 | 82.07 |
| 604 | 79.43 | 84.33 | 76.3 | 82.37 |
| 605 | 79.54 | 84.45 | 76.65 | 82.67 |
| 606 | 79.65 | 84.53 | 77.03 | 82.96 |
| 607 | 79.72 | 84.63 | 77.36 | 83.26 |
| 608 | 79.81 | 84.71 | 77.67 | 83.56 |
| 609 | 79.85 | 84.76 | 77.98 | 83.81 |
| 610 | 79.92 | 84.83 | 78.26 | 84.04 |
| 611 | 79.95 | 84.91 | 78.52 | 84.25 |
| 612 | 79.98 | 84.97 | 78.74 | 84.44 |
| 613 | 79.99 | 85 | 78.97 | 84.63 |
| 614 | 79.98 | 85.01 | 79.19 | 84.79 |
| 615 | 79.98 | 85.02 | 79 37 | 84.97 |
| 616 | 79.94 | 84.96 | 79.51 | 85.09 |
| 617 | 79.88 | 84.92 | 79.66 | 85.2 |
| 618 | 79.83 | 84.83 | 79.79 | 85.29 |
| 619 | 79.78 | 84.81 | 79.91 | 85.4 |
| 620 | 79.74 | 84.77 | 80.05 | 85.49 |
| 621 | 79.68 | 84.75 | 80.15 | 85.56 |
| 622 | 79.61 | 84.69 | 80.25 | 85.62 |
| 623 | 79.56 | 84.66 | 80.39 | 85.73 |
| 624 | 79.56 | 84.64 | 80.53 | 85.86 |
| 625 | 79.55 | 84.63 | 80.68 | 85.95 |
| 626 | 79.54 | 84.6 | 80.8 | 86.03 |
| 627 | 79.54 | 84.56 | 80.96 | 86.12 |
| 628 | 79.55 | 84.54 | 81.12 | 86.23 |
| 629 | 79.57 | 84.53 | 81.29 | 86.38 |
| 630 | 79.59 | 84.52 | 81.48 | 86.52 |
| 631 | 79.63 | 84.57 | 81.7 | 86.68 |
| 632 | 79.69 | 84.59 | 81.92 | 86.82 |
| 633 | 79.82 | 84.69 | 82.18 | 87.04 |
| 634 | 79.94 | 84.78 | 82.45 | 87.25 |
| 635 | 80.12 | 84.92 | 82.75 | 87.48 |
| 636 | 80.3 | 85.02 | 83.06 | 87.72 |
| 637 | 80.44 | 85.1 | 83.34 | 87.93 |
| 638 | 80.63 | 85.15 | 83.66 | 88.18 |
| 639 | 80.82 | 85.24 | 83.94 | 88.39 |
| 640 | 81.05 | 85.37 | 84.23 | 88.6 |
| 641 | 81.28 | 85.53 | 84.51 | 88.79 |
| 642 | 81.57 | 85.77 | 84.82 | 89.03 |
| 643 | 81.88 | 86.03 | 85.11 | 89.25 |
| 644 | 82.22 | 86.28 | 85.39 | 89.49 |
| 645 | 82.55 | 86.55 | 85.68 | 89.72 |
| 646 | 82.92 | 86.82 | 85.99 | 89.92 |
| 647 | 83.34 | 87.12 | 86.27 | 90.13 |
| 648 | 83.69 | 87.38 | 86.48 | 90.3 |
| 649 | 84.12 | 87.69 | 86.71 | 90.46 |
| 650 | 84.58 | 88.02 | 86.94 | 90.62 |
| 651 | 85.02 | 88 37 | 87 13 | 90.74 |
| 652 | 85.5 | 88.73 | 87.33 | 90.9 |
| 653 | 85.99 | 89.11 | 87.53 | 91.05 |
| 654 | 86.51 | 89.45 | 87.71 | 91.17 |
| 655 | 87.04 | 89.79 | 87.87 | 91.32 |
| 656 | 87.56 | 90.15 | 88.02 | 91.43 |
| 657 | 88.07 | 90.55 | 88.2 | 91.58 |
| 658 | 88.61 | 90.96 | 88.39 | 91.71 |
| 659 | 89 11 | 91.33 | 88.56 | 91.83 |
| 660 | 89.62 | 91.72 | 88.74 | 91.93 |
| 661 | 90.12 | 92.08 | 88.89 | 92.01 |
| 662 | 90.54 | 92.41 | 89.01 | 92.1 |
| 663 | 90.97 | 92.73 | 89.11 | 92.2 |
| 664 | 91.39 | 93.04 | 89.23 | 92.3 |
| 665 | 91.78 | 93 33 | 89.36 | 92.38 |
| 666 | 92.17 | 93.65 | 89.48 | 92.5 |
| 667 | 92.57 | 94 | 89.69 | 92.64 |
| 668 | 92.93 | 94.29 | 89.89 | 92.74 |
| 669 | 93.27 | 94.57 | 90.08 | 92.86 |
| 670 | 93.61 | 94.81 | 90.22 | 92.95 |
| 671 | 93.91 | 95.03 | 90.36 | 93.04 |
| 672 | 94.16 | 95.23 | 90.49 | 93.12 |
| 673 | 94.42 | 95.4 | 90.63 | 93.21 |
| 674 | 94.64 | 95.59 | 90.73 | 93.3 |
| 675 | 94.86 | 95.76 | 90.87 | 93.4 |
| 676 | 95.04 | 95.92 | 91.01 | 93.51 |
| 677 | 95.26 | 96.09 | 91.19 | 93.63 |
| 678 | 95.44 | 96.24 | 91.35 | 93.72 |
| 679 | 95.63 | 96.37 | 91.54 | 93.84 |
| 680 | 95.8 | 96.48 | 91.7 | 93.94 |
| 681 | 95.98 | 96.6 | 91.87 | 94.03 |
| 682 | 96 17 | 96.75 | 92.06 | 94.12 |
| 683 | 96.27 | 96.86 | 92.19 | 94.2 |
| 684 | 96.36 | 96.97 | 92.31 | 94.29 |
| 685 | 96.45 | 97.08 | 92.43 | 94.37 |
| 686 | 96.49 | 97.16 | 92.52 | 94.43 |
| 687 | 96.6 | 97.24 | 92.64 | 94.53 |
| 688 | 96.68 | 97.32 | 92.77 | 94.63 |

TABLE 3-continued

| Wavelength (nm) | Lens of Comparative Example 1 Transmittance (%) | Lens of Comparative Example 2 Transmittance (%) | Lens of Example 1 Transmittance (%) | Lens of Example 2 Transmittance (%) |
|---|---|---|---|---|
| 689 | 96.77 | 97.38 | 92.94 | 94.73 |
| 690 | 96.85 | 97.42 | 93.08 | 94.84 |
| 691 | 96.96 | 97.48 | 93.23 | 94.94 |
| 692 | 97.04 | 97.55 | 93.34 | 95 |
| 693 | 97.1 | 97.58 | 93.47 | 95.1 |
| 694 | 97.12 | 97.64 | 93.57 | 95.19 |
| 695 | 97.16 | 97.68 | 93.68 | 95.26 |
| 696 | 97.2 | 97 71 | 93 78 | 95.32 |
| 697 | 97.2 | 97.74 | 93.85 | 95.34 |
| 698 | 97.23 | 97.76 | 93.94 | 95.42 |
| 699 | 97.28 | 97.8 | 94.02 | 95.51 |
| 700 | 97.32 | 97.82 | 94.07 | 95.56 |
| 701 | 97.38 | 97.83 | 94.1 | 95.62 |
| 702 | 97.44 | 97.89 | 94.17 | 95.7 |
| 703 | 97.43 | 97.89 | 94.24 | 95.72 |
| 704 | 97.42 | 97.86 | 94.28 | 95.75 |
| 705 | 97.39 | 97 83 | 94 33 | 95.78 |
| 706 | 97.42 | 97.83 | 94.4 | 95.83 |
| 707 | 97.42 | 97.79 | 94.42 | 95.82 |
| 708 | 97.45 | 97.78 | 94.47 | 95.87 |
| 709 | 97.5 | 97.82 | 94.52 | 95.92 |
| 710 | 97.56 | 97.81 | 94.54 | 95.95 |
| 711 | 97.58 | 97.79 | 94.6 | 95.95 |
| 712 | 97.57 | 97.78 | 94.61 | 95.96 |
| 713 | 97.57 | 97.74 | 94.63 | 95.95 |
| 714 | 97.51 | 97.66 | 94.62 | 95.94 |
| 715 | 97.48 | 97.58 | 94.61 | 95.9 |
| 716 | 97.48 | 97.55 | 94.63 | 95.93 |
| 717 | 97.5 | 97.56 | 94.66 | 95.97 |
| 718 | 97.51 | 97.5 | 94.63 | 95.93 |
| 719 | 97.47 | 97.44 | 94.6 | 95.88 |
| 720 | 97.47 | 97.4 | 94.58 | 95.86 |
| 721 | 97.45 | 97.35 | 94.55 | 95.81 |
| 722 | 97 46 | 97.3 | 94.58 | 95.84 |
| 723 | 97.44 | 97.25 | 94.61 | 95.83 |
| 724 | 97.39 | 97.16 | 94.58 | 95.79 |
| 725 | 97.35 | 97.07 | 94.62 | 95.79 |
| 726 | 97.31 | 97.02 | 94.62 | 95.8 |
| 727 | 97.32 | 96.98 | 94.64 | 95.79 |
| 728 | 97.25 | 96.89 | 94 62 | 95.75 |
| 729 | 97.17 | 96.81 | 94.56 | 95.61 |
| 730 | 97.11 | 96.77 | 94.53 | 95.56 |
| 731 | 97.05 | 96.74 | 94.52 | 95.51 |
| 732 | 97 | 96.68 | 94.49 | 95.47 |
| 733 | 96.9 | 96.56 | 94.47 | 95.42 |
| 734 | 96.8 | 96.44 | 94.44 | 95.41 |
| 735 | 96.73 | 96.37 | 94.41 | 95.41 |
| 736 | 96.7 | 96 28 | 94.38 | 95.42 |
| 737 | 96.69 | 96.22 | 94.38 | 95.43 |
| 738 | 96.64 | 96.15 | 94.36 | 95.39 |
| 739 | 96.61 | 96.06 | 94.31 | 95.33 |
| 740 | 96.51 | 96.02 | 94.27 | 95.26 |
| 741 | 96.43 | 95.97 | 94.27 | 95.23 |
| 742 | 96.31 | 95.89 | 94.23 | 95.2 |
| 743 | 96.16 | 95.81 | 94.16 | 95.17 |
| 744 | 96.07 | 95.76 | 94.13 | 95.21 |
| 745 | 95.99 | 95.72 | 94.15 | 95.2 |
| 746 | 96 | 95.72 | 94.17 | 95.25 |
| 747 | 95.99 | 95.67 | 94.19 | 95.23 |
| 748 | 95.93 | 95.58 | 94.17 | 95.21 |
| 749 | 95.87 | 95.51 | 94.13 | 95.16 |
| 750 | 95.78 | 95.41 | 94.1 | 95.07 |
| 751 | 95.67 | 95 34 | 94 01 | 95.01 |
| 752 | 95.56 | 95.29 | 93.94 | 94.97 |
| 753 | 95.47 | 95.23 | 93.83 | 94.95 |
| 754 | 95.41 | 95.26 | 93.79 | 94.96 |
| 755 | 95.33 | 95.24 | 93.79 | 94.98 |
| 756 | 95.29 | 95.22 | 93.78 | 95 |
| 757 | 95.28 | 95.22 | 93.76 | 94.99 |
| 758 | 95.24 | 95.18 | 93.65 | 94.96 |
| 759 | 95 16 | 95.14 | 93.58 | 94.9 |
| 760 | 95.12 | 95.11 | 93.52 | 94.82 |
| 761 | 95.05 | 95.1 | 93.49 | 94.77 |
| 762 | 95 | 95.02 | 93.43 | 94.73 |
| 763 | 94.89 | 94.94 | 93.4 | 94.68 |
| 764 | 94.82 | 94.89 | 93.39 | 94.68 |
| 765 | 94.81 | 94.85 | 93.37 | 94.67 |
| 766 | 94.76 | 94.8 | 93.31 | 94.63 |
| 767 | 94.7 | 94.79 | 93.23 | 94.57 |
| 768 | 94.75 | 94.88 | 93.18 | 94.56 |
| 769 | 94.69 | 94.87 | 93.11 | 94.48 |
| 770 | 94.61 | 94.84 | 93.08 | 94.46 |
| 771 | 94.58 | 94.8 | 93.08 | 94.4 |
| 772 | 94.53 | 94.68 | 93.02 | 94.35 |
| 773 | 94.48 | 94.59 | 92.95 | 94.26 |
| 774 | 94.41 | 94.51 | 92.87 | 94.19 |
| 775 | 94.34 | 94.49 | 92.82 | 94.16 |
| 776 | 94.33 | 94.44 | 92.76 | 94.08 |
| 777 | 94.25 | 94.42 | 92.72 | 94.03 |
| 778 | 94.19 | 94.42 | 92.72 | 93.99 |
| 779 | 94.17 | 94.38 | 92.7 | 93.96 |
| 780 | 94.11 | 94.36 | 92.72 | 93.92 |
| 781 | 94.05 | 94.3 | 92.7 | 93.9 |
| 782 | 94.07 | 94.27 | 92.74 | 93.92 |
| 783 | 94.05 | 94.22 | 92.68 | 93.86 |
| 784 | 94 | 94.2 | 92.71 | 93.86 |
| 785 | 93.99 | 94.16 | 92.71 | 93.85 |
| 786 | 93.95 | 94.06 | 92.68 | 93.81 |
| 787 | 93.92 | 93.95 | 92.6 | 93.71 |
| 788 | 93.83 | 93.86 | 92.55 | 93.63 |
| 789 | 93.77 | 93.73 | 92.47 | 93.6 |
| 790 | 93.68 | 93.61 | 92.36 | 93.5 |
| 791 | 93.61 | 93.58 | 92.28 | 93.43 |
| 792 | 93.57 | 93.55 | 92.28 | 93.39 |
| 793 | 93.5 | 93.48 | 92.26 | 93.33 |
| 794 | 93.46 | 93.48 | 92.3 | 93.27 |
| 795 | 93.42 | 93.46 | 92.32 | 93.21 |
| 796 | 93.38 | 93 41 | 92 34 | 93.17 |
| 797 | 93.31 | 93.34 | 92.28 | 93.1 |
| 798 | 93.24 | 93.27 | 92.26 | 93.07 |
| 799 | 93.19 | 93 19 | 92.23 | 93.07 |
| 800 | 93.16 | 93.15 | 92.2 | 93.07 |

The disclosure of Japanese Patent Application No. 2019-079855 filed on Apr. 19, 2019 is incorporated herein by reference in their entirety.

All publications, patent applications, and technical standards mentioned in this specification are incorporated herein by reference to the same extent as if each individual publication, patent application, or technical standard was specifically and individually indicated to be incorporated by reference.

The invention claimed is:

1. An optical material in which a transmittance curve satisfies the following characteristics (1) and (2) and a hue in a CIE 1976 (L*, a*, b*) color space satisfies the following characteristic (3), the transmittance curve and the hue being measured at a thickness of 2 mm:
   (1) the transmittance curve has a maximum value of transmittance at a wavelength of from 400 nm to 450 nm or from 520 nm to 570 nm, and a largest value of transmittance at the wavelength of from 400 nm to 450 nm, and transmittance at from 520 nm to 570 nm, are 50% or more,
   (2) the transmittance curve has a minimum value of transmittance at a wavelength of from 470 nm to 500 nm, and the minimum value is 40% or less, and
   (3) in the hue in the CIE 1976 (L*, a*, b*) color space, a* is from 3.0 to 4.5 and b* is from 15 to 22, wherein a color tone adjusting agent is further contained in an amount of from 3 ppm to 20 ppm, and the color tone adjusting agent comprises an anthraquinone-based dye.

2. The optical material according to claim 1, wherein a yellow index (YI) is from 25 to 45.

3. The optical material according to claim 1, wherein an organic dye containing at least one selected from porphyrin-based compounds represented by the following Formula (1) is contained in an amount of from 5 ppm to 50 ppm,

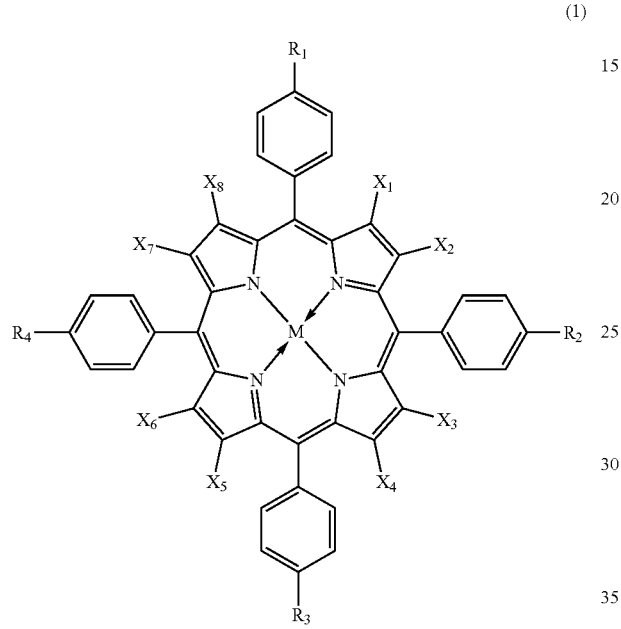

(1)

wherein, in Formula (1), each of $X_1$ to $X_8$ independently represents a hydrogen atom, a linear or branched alkyl group, an ethynyl group, an ethynyl group substituted with a linear or branched alkyl group, an ethynyl group having a phenyl group, or an ethynyl group having a phenyl group substituted with a linear or branched alkyl group, not all of $X_1$ to $X_8$ are hydrogen atoms, each of $R_1$ to $R_4$ independently represents a hydrogen atom or a linear or branched alkyl group, and M represents two hydrogen atoms, a divalent metal atom, a trivalent substituted metal atom, a tetravalent substituted metal atom, a hydroxylated metal atom, or an oxidized metal atom.

4. The optical material according to claim 3, wherein the organic dye contains at least one selected from porphyrin-based compounds represented by the following Formula (1-1) and the following Formula (1-2):

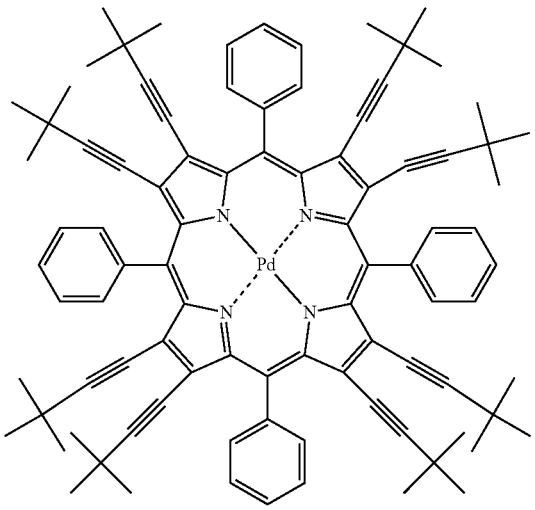

(1-1)

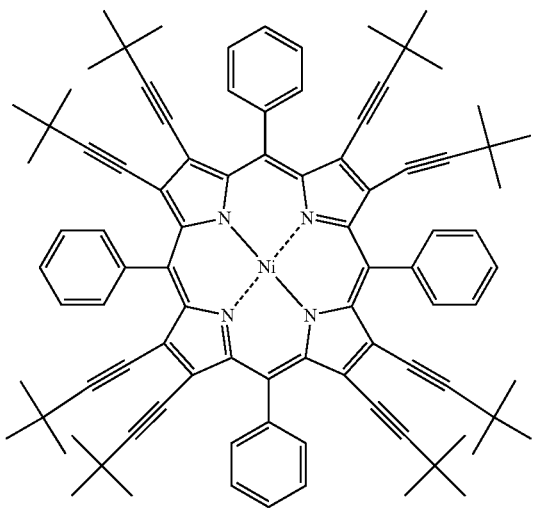

(1-2)

5. The optical material according to claim 1, wherein at least one selected from poly(thio)urethane or poly(thio)urethane urea is contained.

6. The optical material according to claim 1, wherein the optical material is used as a lens for reducing migraines.

7. A method of using the optical material according to claim 1 as a lens for reducing migraines.

* * * * *